United States Patent
Lloyd et al.

(10) Patent No.: US 11,282,614 B2
(45) Date of Patent: Mar. 22, 2022

(54) DUAL-CRITERION FUEL CANISTER SYSTEM

(71) Applicant: Westinghouse Electric Company LLC, Cranberry Township, PA (US)

(72) Inventors: Timothy M. Lloyd, Pittsburgh, PA (US); Robert D. Quinn, Morgan Hill, CA (US); Emiliano Gonzalez Herranz, Madrid (ES); Emmanuel Mercier, Athis Mons (FR); David Castrillon Cabaleiro, Cantabria (ES)

(73) Assignee: Westinghouse Electric Company LLC, Cranberry Township, PA (US)

( * ) Notice: Subject to any disclaimer, the term of this patent is extended or adjusted under 35 U.S.C. 154(b) by 412 days.

(21) Appl. No.: 16/257,776

(22) Filed: Jan. 25, 2019

(65) Prior Publication Data
US 2019/0237210 A1    Aug. 1, 2019

Related U.S. Application Data

(60) Provisional application No. 62/622,351, filed on Jan. 26, 2018.

(51) Int. Cl.
*G21F 5/00* (2006.01)
*G21F 5/10* (2006.01)
(Continued)

(52) U.S. Cl.
CPC .............. *G21F 5/008* (2013.01); *G21F 5/012* (2013.01); *G21F 5/10* (2013.01); *G21C 19/40* (2013.01); *G21F 5/06* (2013.01); *G21F 9/34* (2013.01)

(58) Field of Classification Search
CPC . G21F 5/008; G21F 5/012; G21F 5/10; G21F 5/06; G21F 9/34; G21C 19/40
(Continued)

(56) References Cited

U.S. PATENT DOCUMENTS 4,983,352 A    1/1991   Efferding
8,798,224 B2   8/2014   Singh
(Continued)

FOREIGN PATENT DOCUMENTS

JP    2005331359 A    12/2005
JP    2011043426 A    3/2011
(Continued)

OTHER PUBLICATIONS

International Search Report—PCT/US2019/015169.
Supplementary European Search Report for corresponding European Patent Application No. 19757187.0, dated Nov. 8, 2021.

*Primary Examiner* — Nicole M Ippolito
(74) *Attorney, Agent, or Firm* — K&L Gates LLP

(57) ABSTRACT

A modular dry spent fuel canister system in which several different types of inner spent nuclear fuel canisters can be loaded into the same outer cask family. This family typically includes a storage overpack, a transfer cask, a transportation cask and support or auxiliary hardware. The various canisters can be loaded interchangeably into the different types of outer casks. The inner canisters are differentiated not by physical fuel type or dimension, but by the engineering objective or criterion that applies to the spent fuel being stored. One such objective may be for a single canister to store a large number of assemblies economically and safely. A second is a canister designed to greatly reduce the cooling time (or radioactive decay time) that must pass in order to load spent nuclear fuel for off-site storage, so as to meet the decay heat requirements and capabilities of the off-site storage system.

21 Claims, 20 Drawing Sheets

(51) Int. Cl.
*G21F 9/34* (2006.01)
*G21C 19/40* (2006.01)
*G21F 5/008* (2006.01)
*G21F 5/012* (2006.01)
*G21F 5/06* (2006.01)

(58) Field of Classification Search
USPC ......... 250/505.1, 506.1, 515.1, 516.1, 517.1, 250/518.1, 519.1
See application file for complete search history.

(56) References Cited

U.S. PATENT DOCUMENTS

| | | | |
|---|---|---|---|
| 9,831,005 B2 | 11/2017 | Singh | |
| 9,865,366 B2 | 1/2018 | Lehnert et al. | |
| 2008/0137794 A1* | 6/2008 | Tjersland | G21C 19/04 376/272 |
| 2010/0272225 A1 | 10/2010 | Singh | |
| 2014/0039235 A1* | 2/2014 | Subiry | G21F 5/10 588/16 |
| 2014/0039325 A1* | 2/2014 | Belleville | A61M 25/09 600/478 |
| 2014/0270043 A1* | 9/2014 | Lehnert | G21F 5/008 376/272 |
| 2014/0270073 A1* | 9/2014 | Spahn | A61B 6/482 378/62 |
| 2016/0314863 A1* | 10/2016 | Singh | G21F 5/012 |

FOREIGN PATENT DOCUMENTS

| | | |
|---|---|---|
| JP | 2014059266 A | 4/2014 |
| JP | 2017201260 A | 11/2017 |
| WO | 2010129767 A2 | 11/2010 |

\* cited by examiner

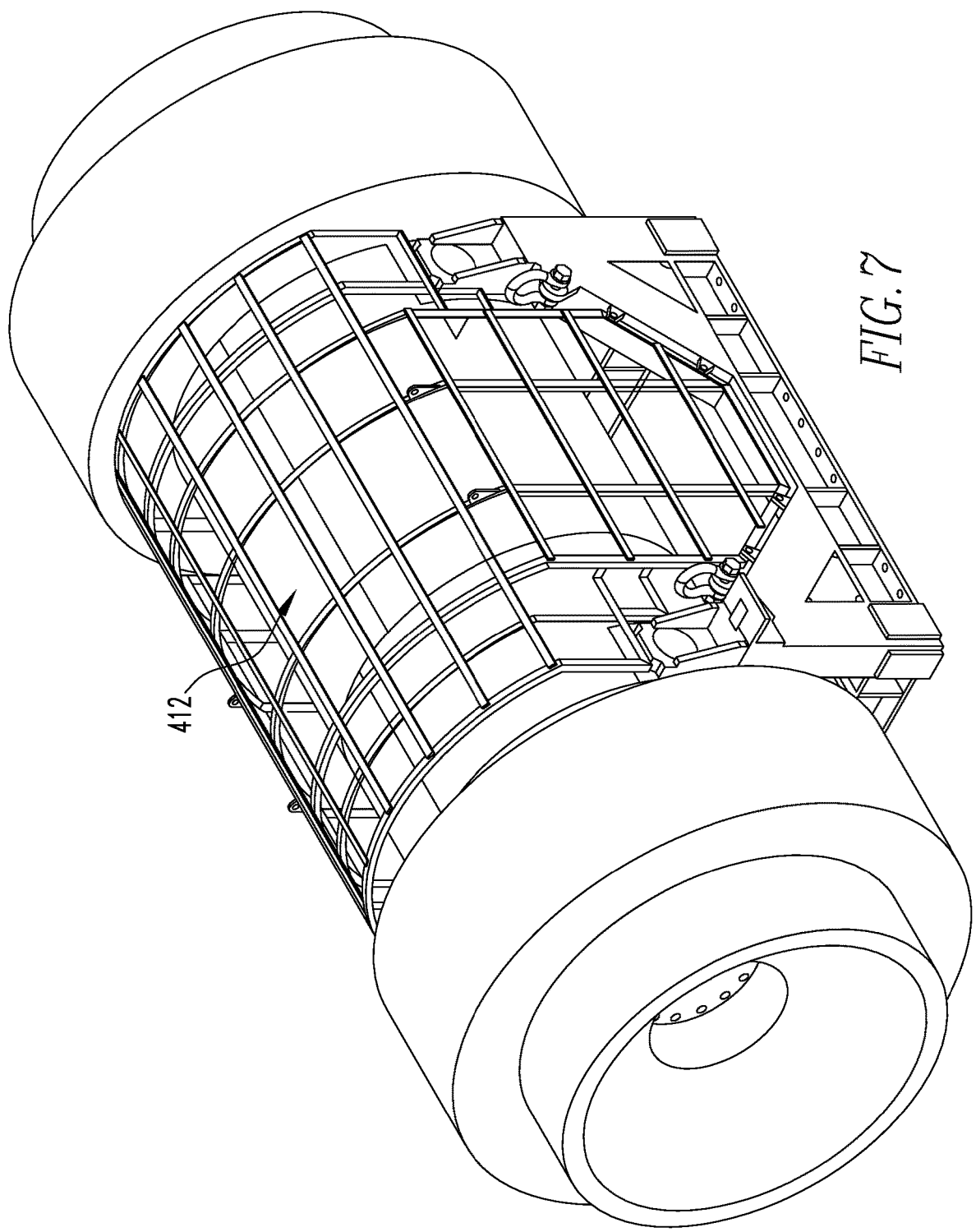

DUAL-CRITERION FUEL CANISTER SYSTEM

CROSS-REFERENCE TO RELATED APPLICATION

This application claims priority from and claims the benefit of U.S. Provisional Application Ser. No. 62/622,351, filed Jan. 26, 2018, and entitled "DUAL-CRITERION FUEL CANISTER SYSTEM."

BACKGROUND

1. Field

This application pertains generally to spent nuclear fuel storage systems and, more particularly to spent nuclear fuel dry storage systems.

2. Related Art

FIG. 1 illustrates a typical pressurized water nuclear reactor fuel assembly 20 for supplying nuclear fuel to a reactor. Fuel assembly 20 includes a bottom nozzle 22 and a top nozzle 24, between which are disposed elongated fuel rods 26. Each fuel rod 26 includes a cylindrical housing made of zirconium alloy such as commercially available "zircaloy-4", and is filled with pellets of fissionable fuel enriched with U-235. Within the assembly of fuel rods 26, tubular guides (not shown) are disposed between nozzles 22 and 24 to accommodate movably mounted control rods (not illustrated) and measuring instruments (not illustrated). The ends of these tubular guides are attached to nozzles 22 and 24 to form a skeletal support for fuel rods 26, which are not permanently attached to nozzles 22 and 24. Grid members 28 have apertures through which fuel rods 26 and the tubular guides extend to bundle these elements together. Commercially available fuel assemblies include between 179 and 264 fuel rods, depending upon the particular design. A typical PWR fuel assembly, for example, is about 4.1 meters long, about 19.7 cm wide, and has a mass of about 585 kg.

After a typical service life of 4-5 years in a pressurized water reactor (PWR), the U-235 enrichment of a fuel assembly 20 is depleted. Furthermore, a variety of fission products, having various half-lives, are present in rods 26. These fission products generate intense radioactivity and heat when assemblies 20 are removed from the reactor, and accordingly the assemblies 20 are moved to a pool containing boron salts dissolved in water for short-term storage. Such a pool is designated by reference number 30 in FIG. 2.

Pool 30 is typically 12.2 meters deep. A number of spent fuel racks 32 positioned at the bottom of pool 30 are provided with storage slots 34 to vertically accommodate fuel assemblies 20. A cask pad 36 is located at the bottom of pool 30.

During the period when fuel assemblies 20 are stored in pool 30, the composition of the spent fuel in rods 26 changes. Isotopes with short half-lives decay, and consequently the proportion of fission products having relatively long half-lives increases. Accordingly, the level of radioactivity and heat generated by a fuel assembly 20 decreases relatively rapidly for a period and eventually reaches a state wherein the heat and radioactivity decrease very slowly. Even at this reduced level, however, rods 26 must be reliably isolated from the environment for the indefinite future.

Dry storage casks provide one form of long-term storage for the spent fuel. After the heat generated by each fuel assembly 20 falls to a predetermined amount—such as 0.5 to 1.0 kilowatt per assembly, after perhaps 10 years of storage in pool 30—an opened cask is lowered into a spent fuel pool. By remote control the spent fuel is transferred to the cask, which is then removed from pool 30, sealed, and drained of spent fuel pool water. The cask can then be suitably processed and transported to an above-ground storage area for long-term storage.

The requirements which must be imposed on such a cask are rather severe. The cask must be immune from chemical attack during long-term storage. Furthermore, it must be sufficiently rugged mechanically to avoid even tiny ruptures or fractures during long-term storage and during transportation, when the cask might be subjected to rough treatment or accidents such as drops. Moreover, the cask must be able to transmit heat generated by the spent fuel to the environment while nevertheless shielding the environment from radiation generated by the spent fuel. The temperature of the rods 26 must be kept below a maximum temperature, such as 400 degrees C., to prevent deterioration of the zirconium alloy housing. Provisions must also be made to ensure that a chain reaction cannot be sustained within the cask; that is, that the effective criticality factor $K_{eff}$ remains less than one so that a self-sustaining reaction does not occur. These requirements impose stringent demands upon the cask, which must fulfill its storage function in an utterly reliable manner.

A modular dry spent fuel canister system is a system in which one of several different types of inner spent nuclear fuel canisters (typically welded stainless or carbon steel right circular cylinders) can be loaded into one of an outer cask family, depending on the stage of storage the inner canister is undergoing. This family of outer casks would typically include a storage overpack for long term dry storage, a transfer cask for transferring the fuel assemblies out of the spent fuel pool, and a transportation cask for shipping the fuel assemblies to a different storage location. For a modular system, the various canisters can be loaded interchangeably into the different types of outer casks.

As presently supplied modular spent fuel canister systems offer an inner canister designed for one type of spent fuel or another (e.g., BWR, PWR, PWR XL, or VVER fuel), or Greater than Class C Waste (GTCC). The inventors of this application recognize that the industry would be better served if various canisters were designed for a focused engineering objective or criterion that would apply to the high level waste being stored rather than simply to the type of spent radioactive waste being stored.

SUMMARY

This invention achieves the foregoing objective by providing a dry nuclear component storage system. The dry nuclear component storage system includes an outer cask system comprising a plurality of outer casks including a storage overpack, a transfer cask and a transportation cask, with each of the outer casks having a similar interior profile. The dry nuclear component system also includes an inner canister system comprising a plurality of inner canisters each configured to store an irradiated nuclear plant component or high level waste, with a common engineering objective or criterion and having an outer envelope that fits within the interior profile of the outer casks. In one embodiment the engineering objective or criterion is a high capacity canister configured to store a large number of the irradiated nuclear plant components or a large amount of the high level waste. By focusing on this objective alone, the canister can be simplified, potentially leading to substantial cost reductions. This can be done, for example, by taking advantage of burnup credit, since criteria like minimum burnup can be set for the various locations. Coupled with the exclusion of moderator during subsequent transportation operations and the crediting, when applicable, of boric acid during loading in the spent fuel pool, this simplification may include the elimination of unnecessary neutron absorbing materials.

In another embodiment the common engineering objective or criterion is a minimum cooling time canister configured to greatly reduce the cooling time or radioactive decay time that must pass to move the minimum cooling time canister to a new location so as to meet the decay heat requirements and capabilities of the new location. In such an embodiment the dry nuclear component canister system may include a vent and duct system between the inner canister and the outer cask configured to remove heat from the inner canister. In one such embodiment the vent and duct system includes an intake in the lower portion of the outer cask, an outlet in the upper portion of the outer cask and a duct extending between the intake and the outlet between an inner side of the outer cask and an outer side of the inner canister. Such an embodiment may also have fins that extend outwardly from an outside wall of the inner canister into the duct. Preferably the fins are supported from the inner canister.

Focusing on an engineering objective of accommodating spent fuel at a minimum cooling time leads to the possibility of storing fuel at times as short as 1.5 years. At times this short, it becomes attractive to consider the problem of accommodating decay heat as one which is essentially a time-varying one—in other words, a transient problem. In one example non-limiting study, it has been shown that at a decay time of 1.5 years, spent fuel assemblies have a decay heat which may decay by approximately 10% per month. In this environment, there are new tools with which one can approach the problem of thermal accommodation. For example, the quantity of fuel to be loaded in a canister can be varied, increasing the number of assemblies during the loading process. One embodiment, for example, consists of a 21-slot canister housing from 16 to 21 assemblies, with the number accommodated increasing over successive canisters loaded throughout a relatively short loading campaign. Thus the later canisters would house more spent fuel assemblies than the earlier ones. Shorter cooling times still are possible, but present industry and regulatory positions make 1.5 years a convenient present minimum decay time.

The inner canister may also be configured in a shape having an inner concentric canister wall within and spaced from an outer concentric canister wall with flat plates on each end to enclose the storage canister space (hereafter referred to as the enhanced surface area canister shape), including fins supported from the inner canister wall, that extend inwardly in a generally radial direction into a generally open space surrounded on a side by the inner concentric canister wall and open to an external environment. In one such embodiment the duct is an annular passage between the outer cask and the inner canister.

The dry nuclear component canister system may also include an active cooling system configured to cool the inner canister during loading of the irradiated nuclear plant component or high level waste. In one such embodiment the active cooling system draws helium through the inner canister. The inner canister may also be pressurized with helium. In such case the pressure of the helium is slightly above atmospheric pressure.

In still another embodiment a wall of the inner canister comprises a composite matrix metal structural material. Preferably, the composite matrix metal material comprises a metal matrix composite. The inner canister may take the form of the enhanced surface area canister shape, having two concentric vertically extending walls.

BRIEF DESCRIPTION OF THE DRAWINGS

A further understanding of the invention can be gained from the following description of the preferred embodiments when read in conjunction with the accompanying drawings in which:

FIG. 7 is simplified isometric view of an outer cask for use in a dry nuclear component handling arrangement, in accordance with another non-limiting embodiment of the disclosed concept;

DESCRIPTION OF THE PREFERRED EMBODIMENT

Figure 1:
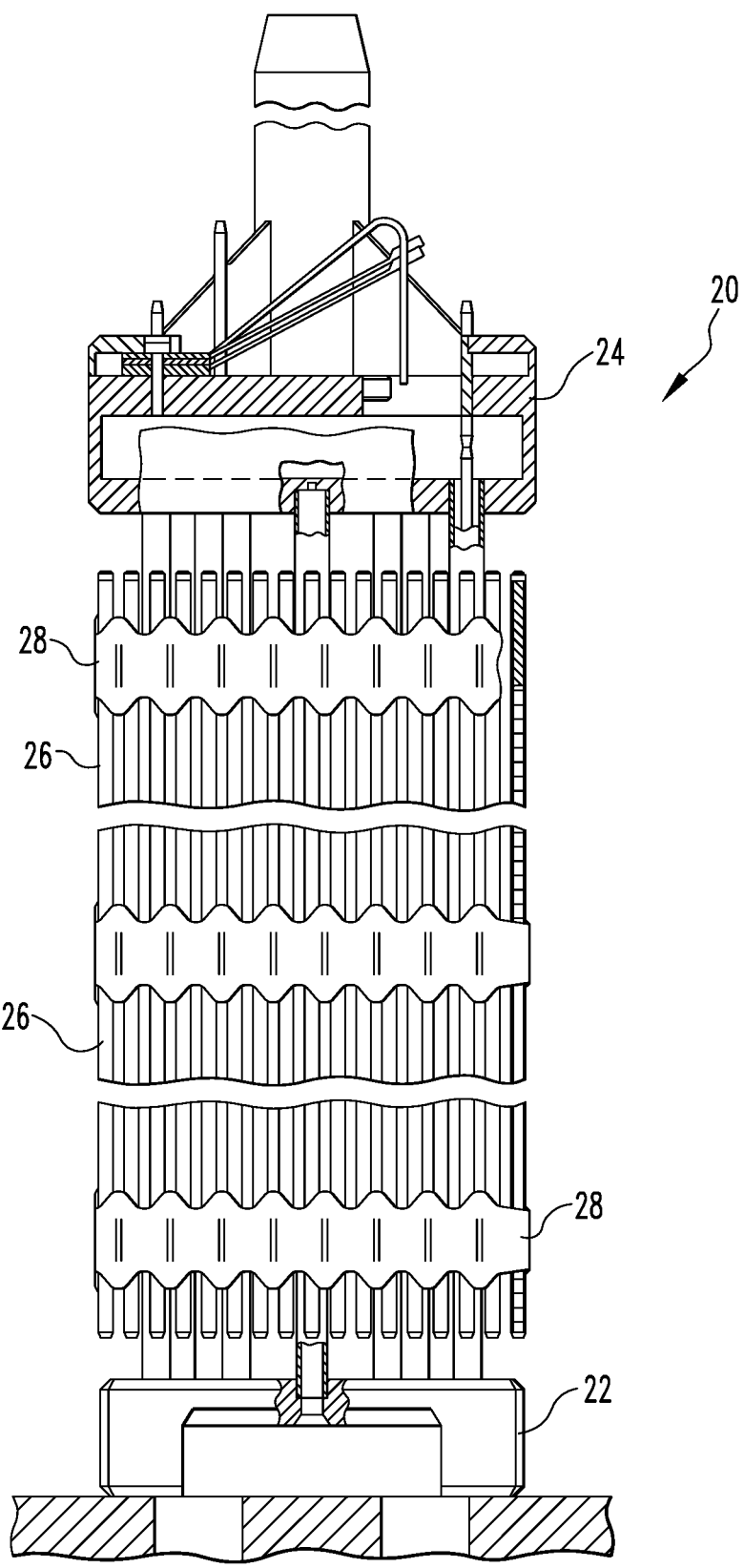
FIG. 1 is an elevation view of a typical pressurized water reactor fuel assembly.
Figure 2:
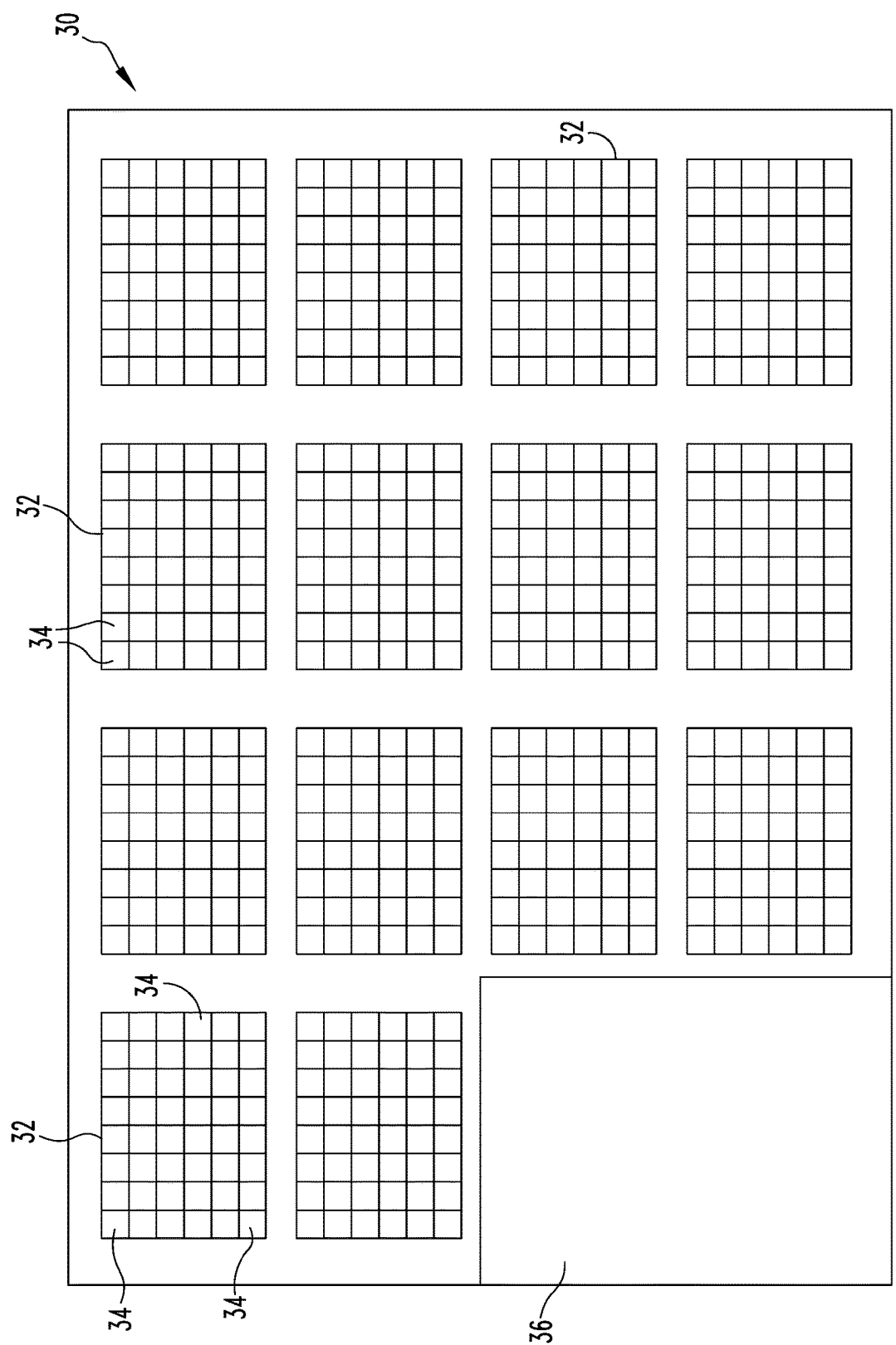
FIG. 2 is a top plan view of a pool for short-term storage of spent fuel assemblies.

Referring more particularly to the Figures, FIGS. 3A-3D are isometric section, top, elevation section, and top section views, respectively, of a dry nuclear component handling arrangement 110, in accordance with one non-limiting embodiment of the disclosed concept. As shown most clearly in FIG. 3A, the arrangement 110 includes an outer cask (e.g., without limitation, storage overpack 112) and an inner canister 142 selectively disposed within the outer cask. The storage overpack 112 has a cask housing 114 defining and interior envelope 116 (which in the illustrated example embodiment is generally cylindrical in shape). The cask housing 114 can generally be stated as including a cylindrical-shaped body (e.g., without limitation, a concrete body 118), a tubular-shaped auxiliary shielding shell 120 disposed internal and being generally concentric with the body 118, and a storage lid 122 which is selectively coupled to concrete body 118 (e.g., via bolts or other suitable connection mechanisms). The shielding shell 120 assists with performing shielding functions, which is particularly important for the MCTC 142, which has significantly higher shielding sources associated with the higher decay heats. Discussed in further detail below, the inner canister 142 has a canister housing 144 which is configured to store a quantity of irradiated nuclear plant components or high level waste (e.g., a plurality of PWR fuel assemblies and/or a plurality of Boiling Water Reactor (BWR) fuel assemblies) therein. Furthermore, the canister housing 144 has an outer envelope 146 (which in the illustrated example embodiment is generally cylindrically shaped) which is configured to fit within the interior envelope 116 of the storage overpack 112. As will be discussed in greater detail below, the inner canister 142 is structured to function as a minimum cooling time canister (MCTC 142).

Figure 3A:
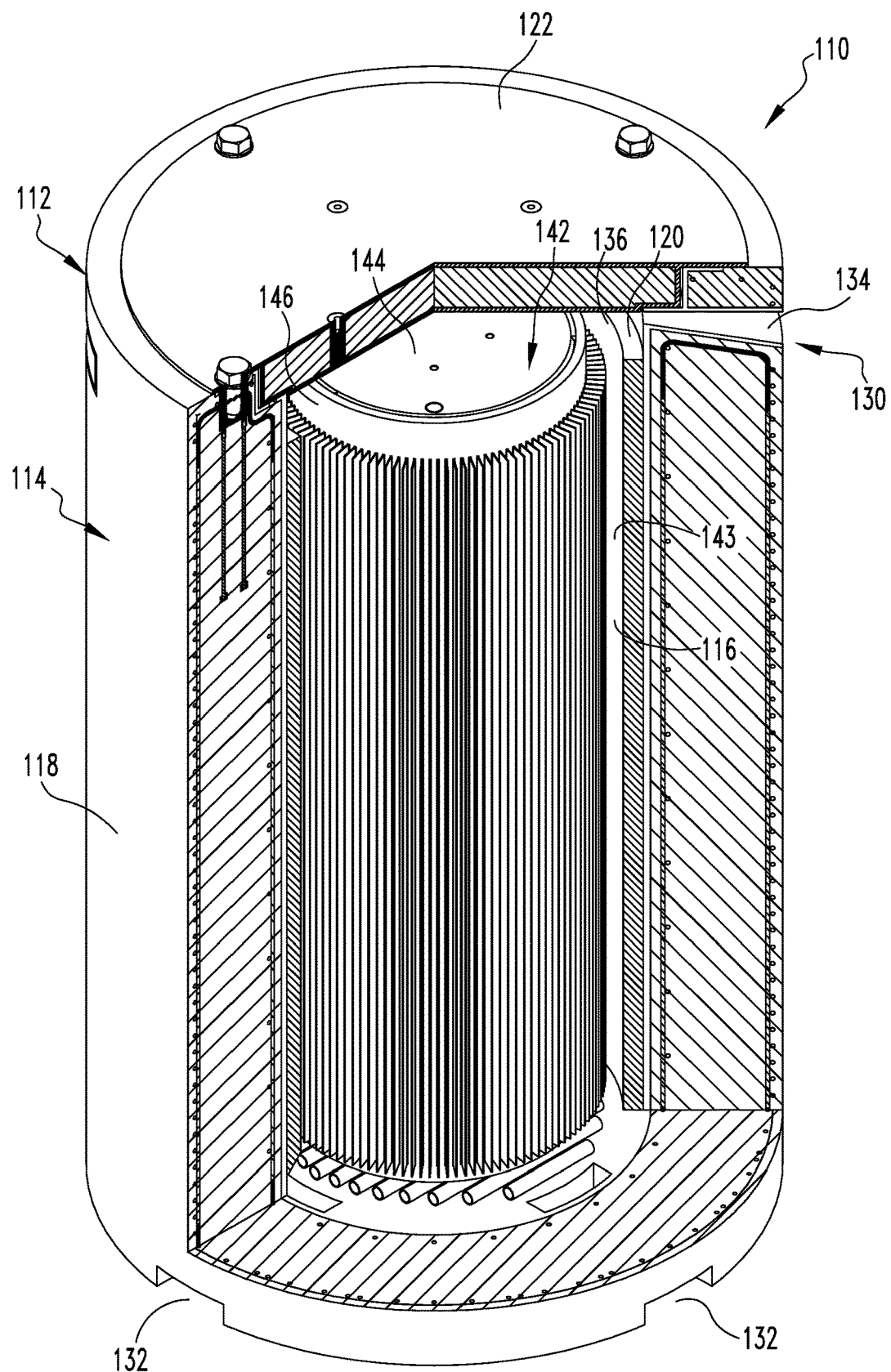
FIG. 3A is an isometric view of a dry nuclear component handling arrangement in accordance with one non-limiting embodiment of the disclosed concept shown with a portion of an outer cask thereof sectionally removed in order to show details of the outer cask as well as an inner canister of the arrangement.
Figure 3B:
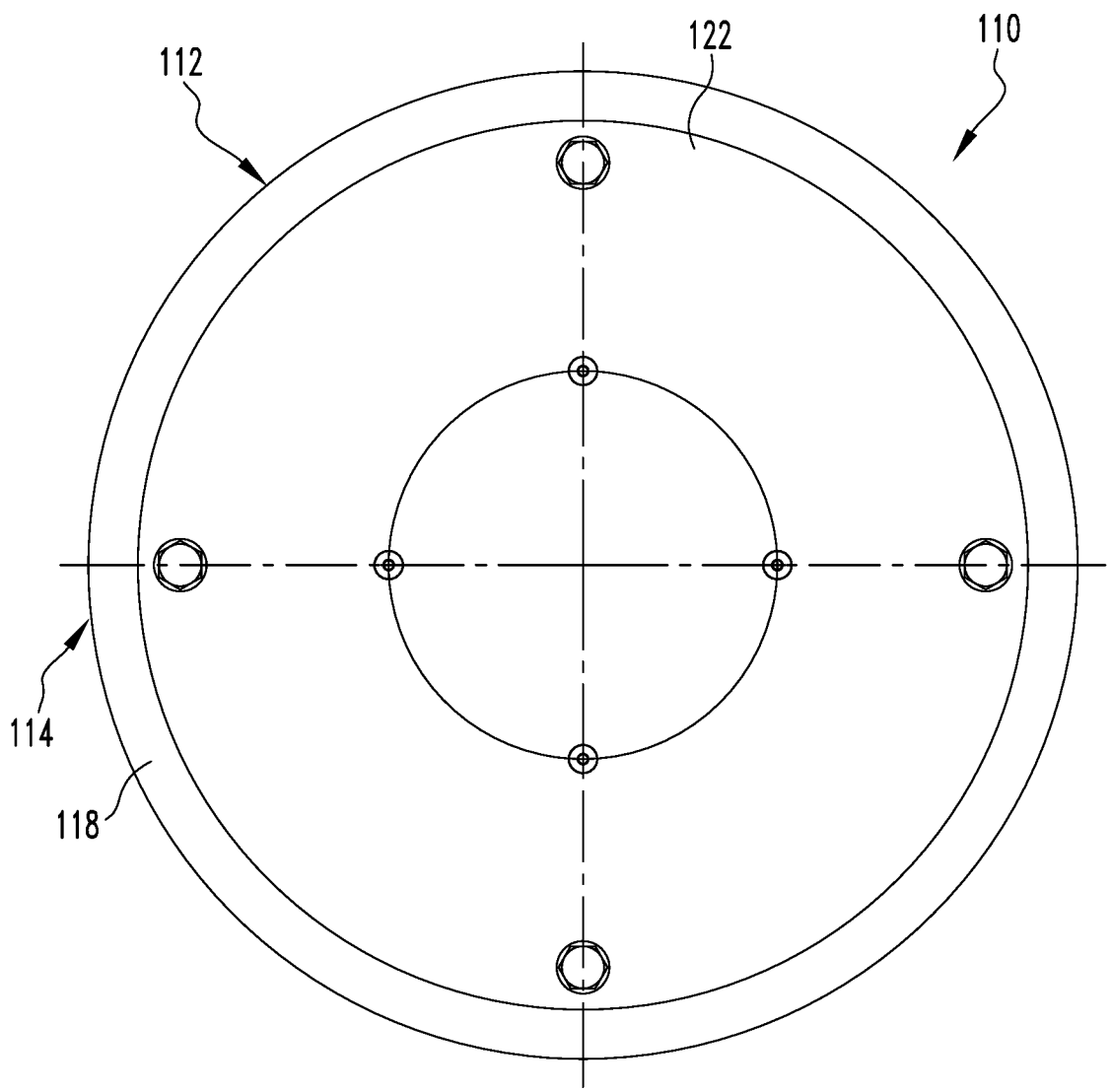
FIG. 3B is a top view of the dry nuclear component handling arrangement of FIG. 3A.
Figure 3C:
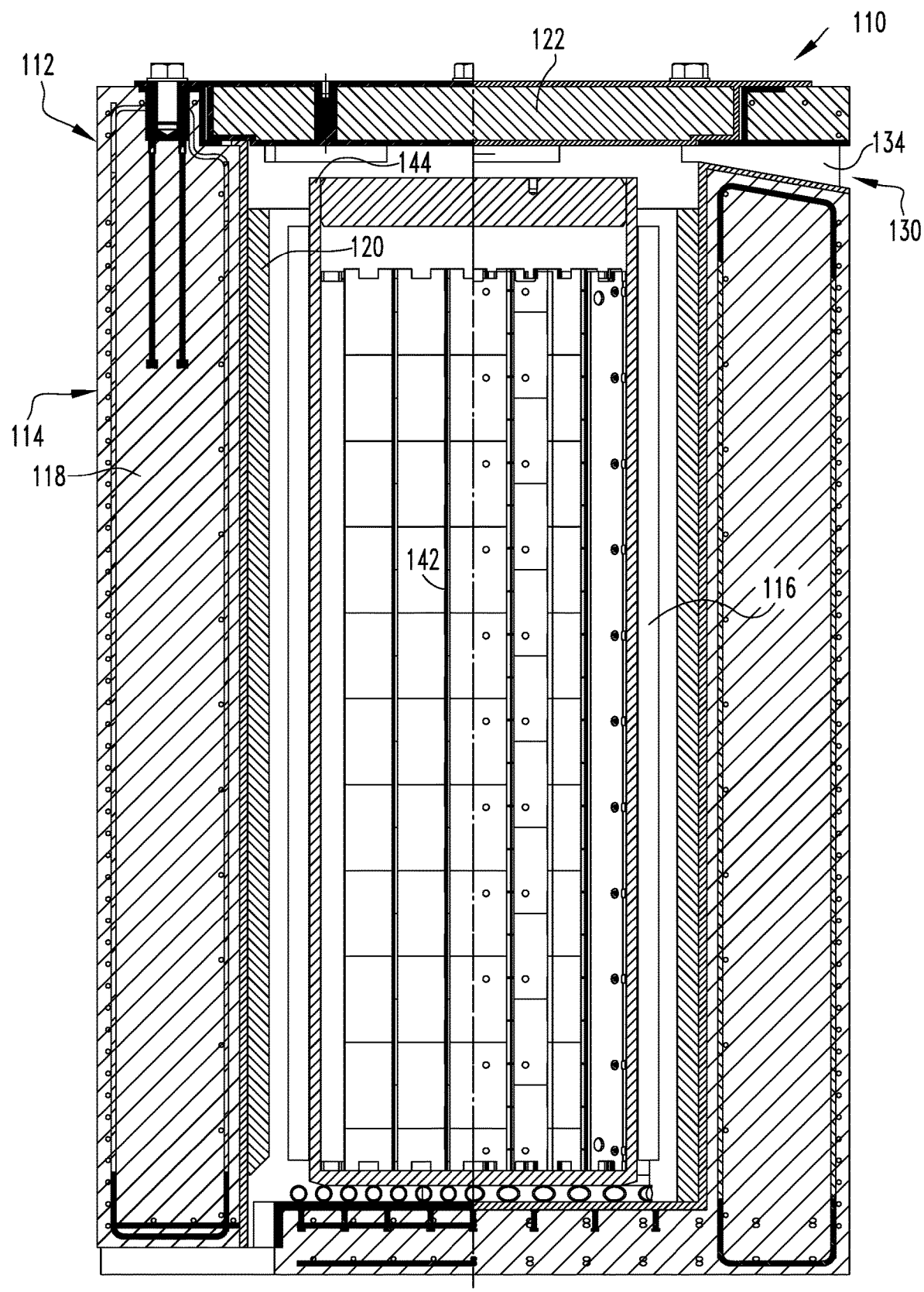
FIG. 3C is a sectional elevation view of the dry nuclear component handling arrangement of FIG. 3A.
Figure 3D:
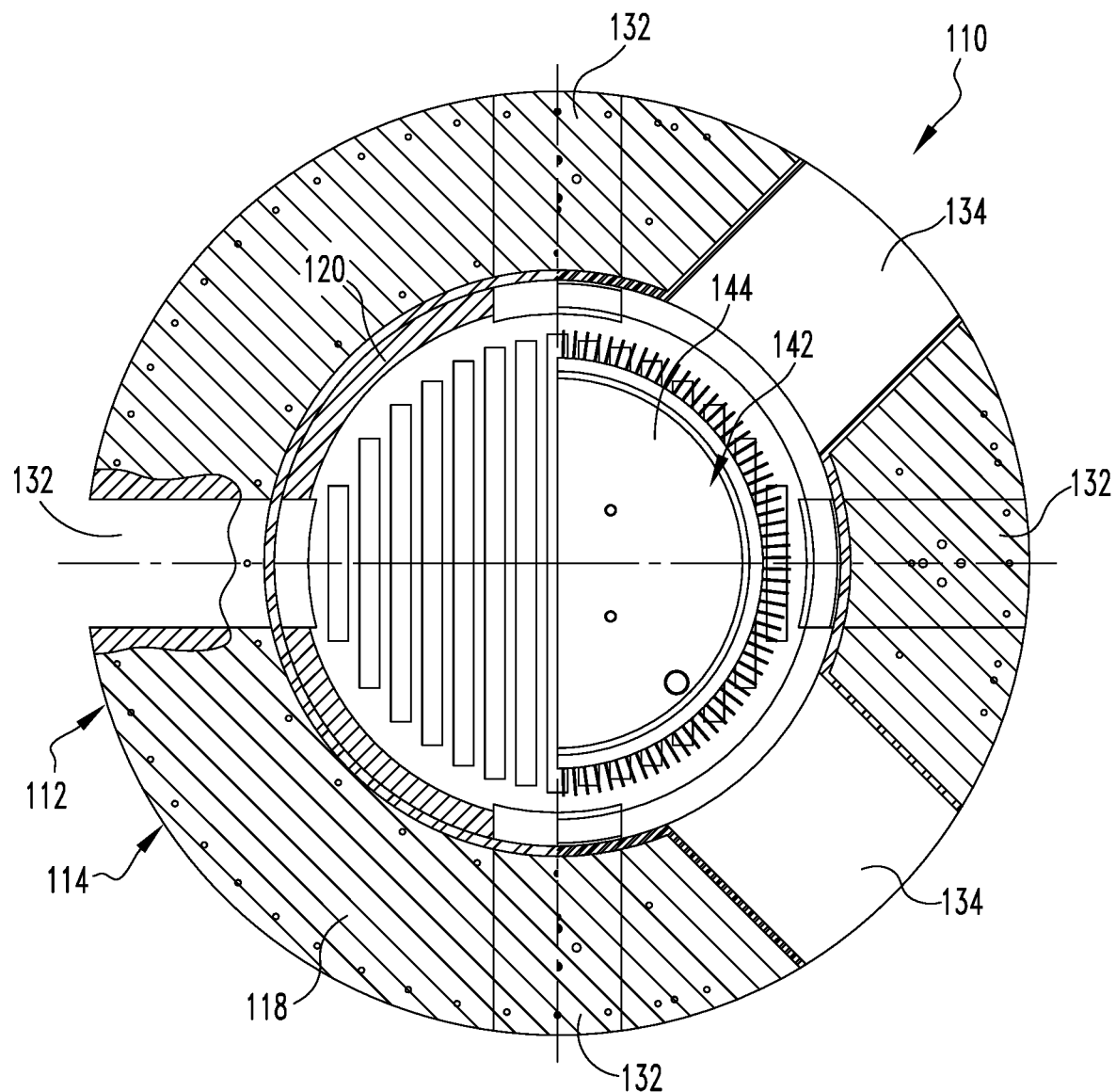
FIG. 3D is a sectional view of the dry nuclear component handling arrangement of FIG. 3A.

Continuing to refer to FIG. 3A, the arrangement 110 further includes a vent and duct system 130 between the inner canister 142 and the storage overpack 112 which is configured to remove heat from the inner canister 142. The vent and duct system 130 includes an intake 132 defined in a lower portion of the storage overpack 112, an outlet 134 defined in an upper portion of the storage overpack 112, and a duct 136 extending between the intake 132 and the outlet 134 between an inner side (not numbered) of the storage overpack 112 an outer side (not numbered) of the inner canister 142. In one example embodiment, the duct 136 is an annular passage between the storage overpack 112 and the inner canister 142. This technology represents the ability of the system to use natural convection to remove heat from the surface of the inner canister 142. In one embodiment, an annular gap is provided between the inside wall of the storage overpack 112 and the outside wall of the MCTC 142 with the duct and vent system 130 that removes heat from the inner canister surface as well as the storage overpack 112.

Additionally, the arrangement 110 may further include an active cooling system (not shown) for cooling the inner canister 142 during loading of the irradiated nuclear plant components or high level waste therein. The active cooling system may be configured to draw helium through the inner canister 142. High helium pressures advantageously assist in expelling heat as well as aid in the drying process (e.g., as opposed to using strict vacuum drying), which will lead to sizeable thermal benefits during drying operations.

FIGS. 4A-4D are isometric section, top, elevation section, and top section views, respectively, of a dry nuclear component handling arrangement 210, in accordance with one non-limiting embodiment of the disclosed concept. As shown most clearly in FIG. 4A, the arrangement 210 includes an outer cask (e.g., without limitation, storage overpack 212) and an inner canister 242 selectively disposed within the storage overpack 212. The storage overpack 212 has a cask housing 214 defining and interior envelope 216 (which in the illustrated example embodiment is generally cylindrical in shape). The cask housing 214 can generally be stated as including a cylindrical-shaped body (e.g., without limitation, a concrete body 218) and a storage lid 222 connected to the concrete body 218 (e.g., via bolts or other suitable connection mechanisms). The inner canister 242 has a canister housing 244 configured to store a quantity of irradiated nuclear plant components or high level waste (e.g., a plurality of PWR fuel assemblies and/or a plurality of Boiling Water Reactor (BWR) fuel assemblies) therein. Furthermore, the canister housing 244 has an outer envelope 246 (which in the illustrated example embodiment is generally cylindrically shaped) configured to fit within the interior envelope 216 of the storage overpack 212. As will be discussed in greater detail below, the inner canister 242 is structured to function as a high capacity canister (HCC 242).

Figure 4A:
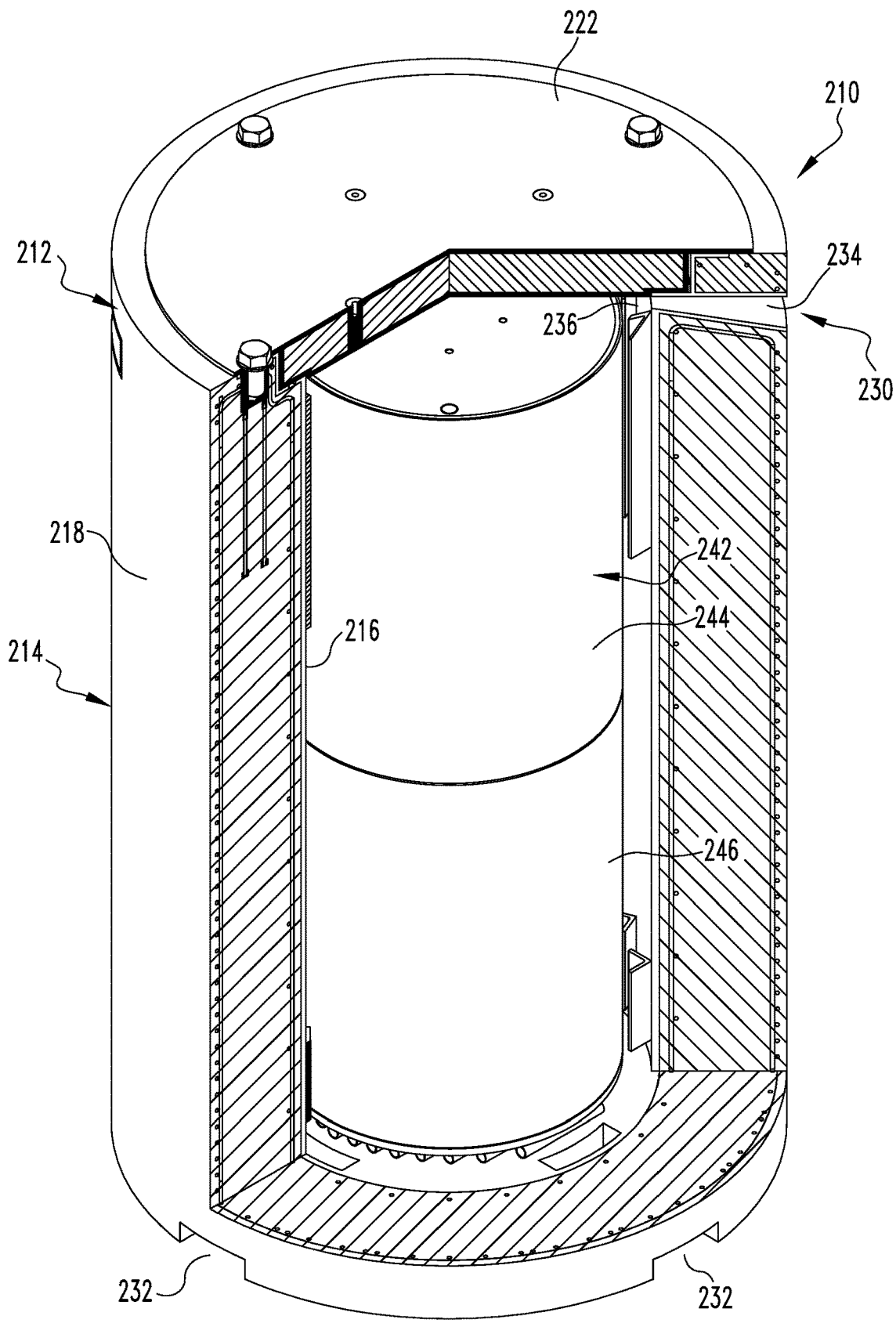
FIG. 4A is an isometric view of another dry nuclear component handling arrangement, in accordance with another non-limiting embodiment of the disclosed concept shown with a portion of an outer cask thereof sectionally removed in order to show details of the outer cask as well as an inner canister of the arrangement.
Figure 4B:
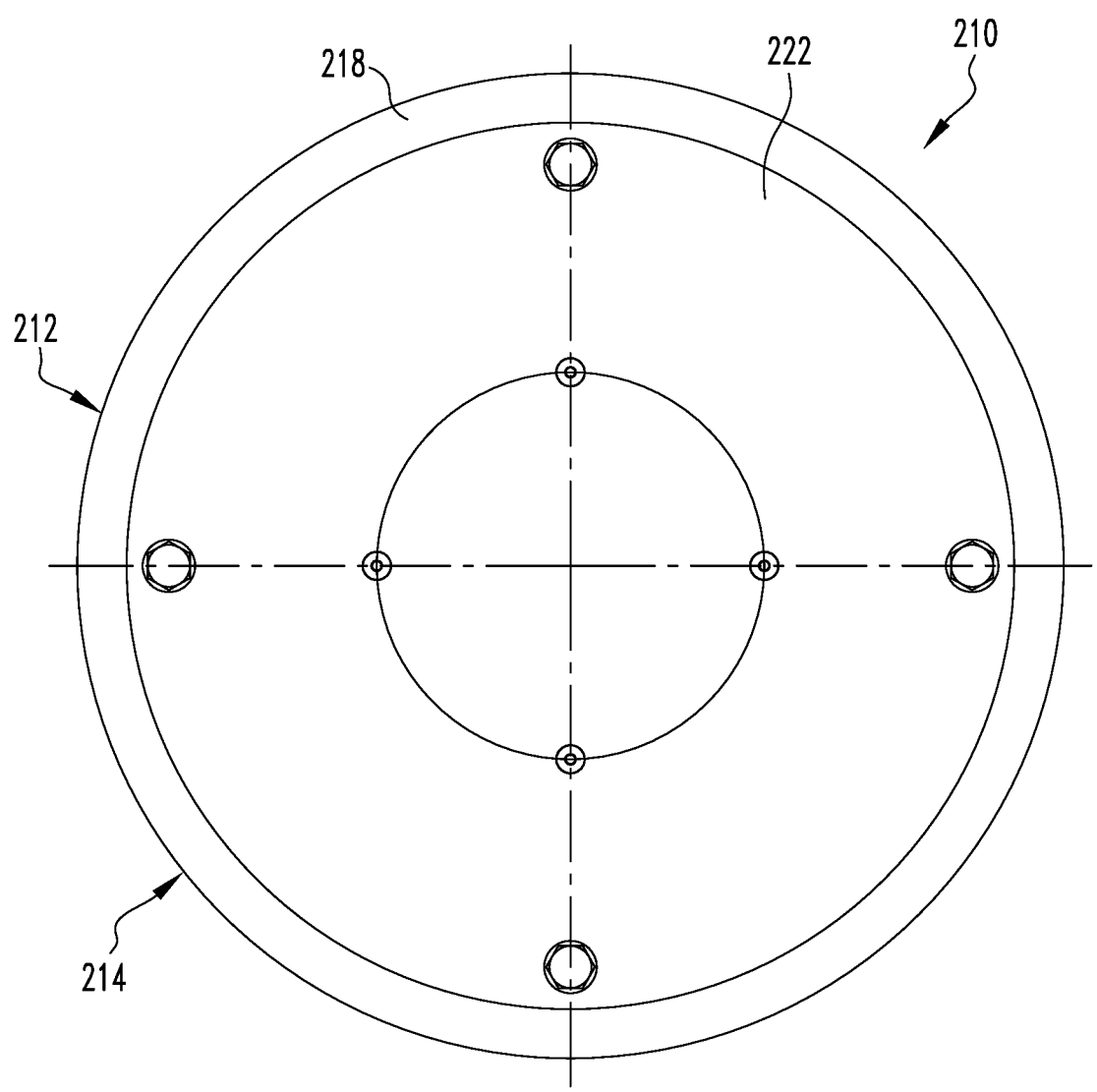
FIG. 4B is a top view of the dry nuclear component handling arrangement of FIG. 3A.
Figure 4C:
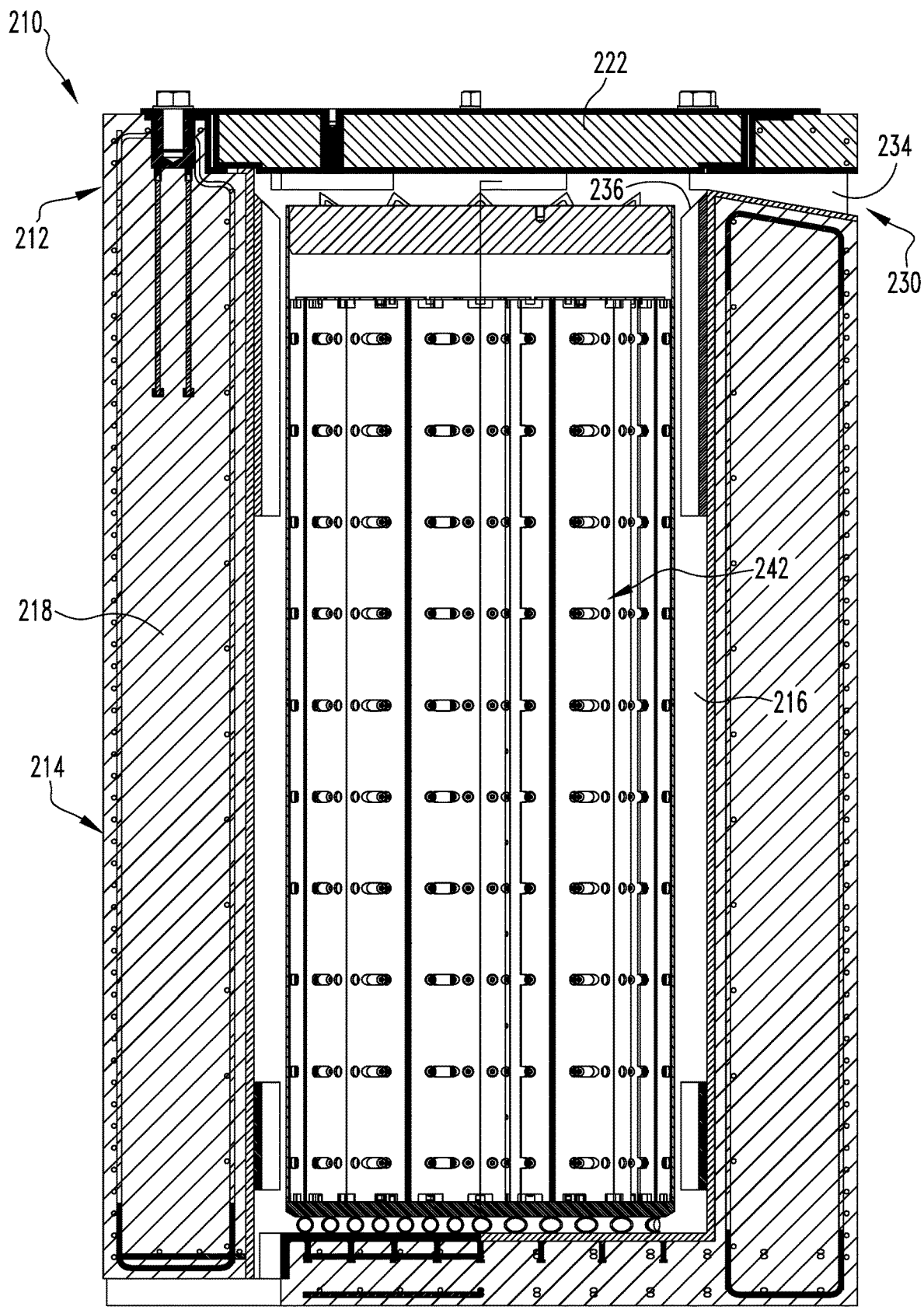
FIG. 4C is a sectional elevation view of the dry nuclear component handling arrangement of FIG. 4A.
Figure 4D:
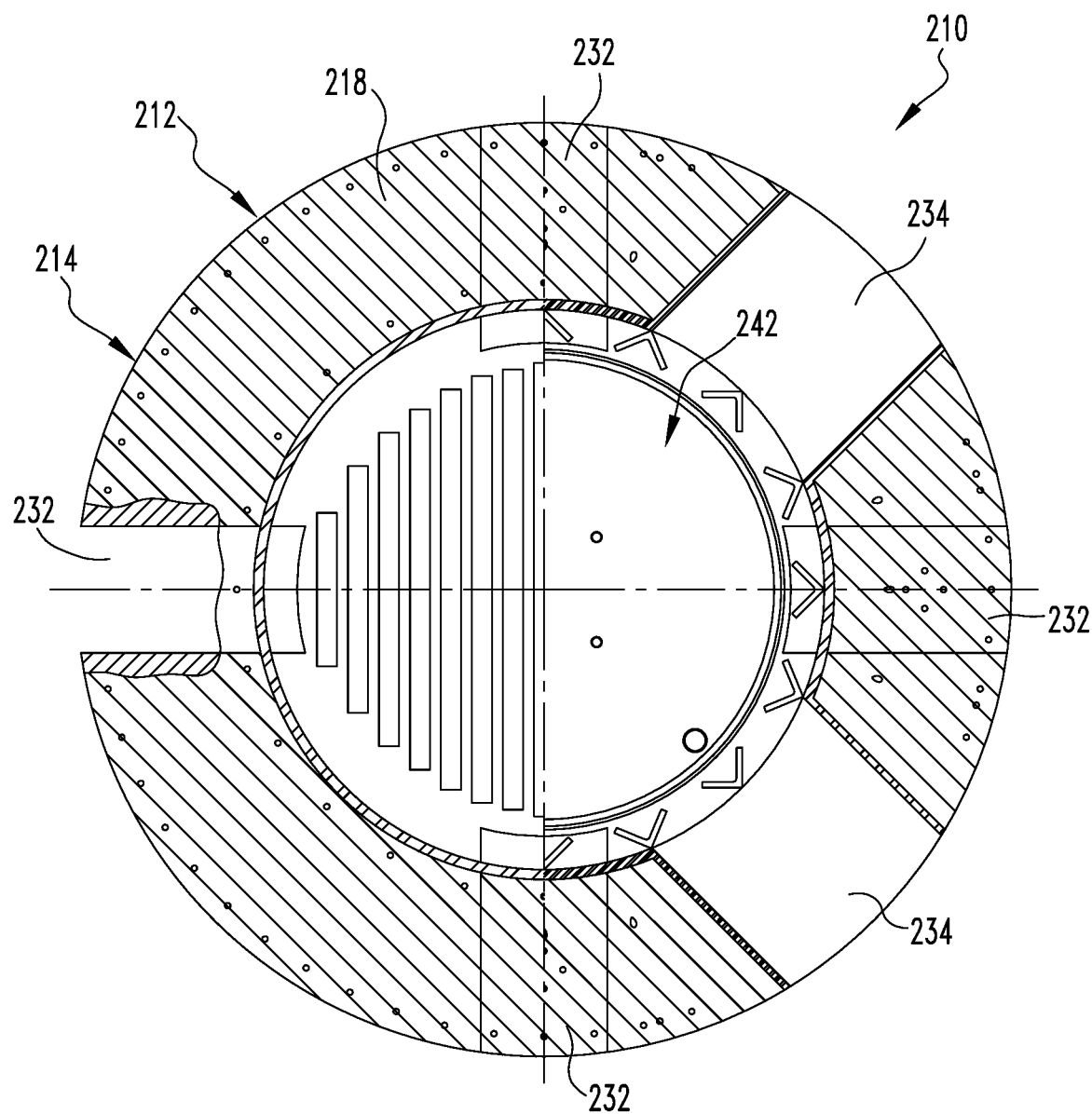
FIG. 4D is a sectional view of the dry nuclear component handling arrangement of FIG. 4A.

Continuing to refer to FIG. 4A, the arrangement 210 further includes a vent and duct system 230 between the HCC 242 and the storage overpack 212 configured to remove heat from the HCC 242. The vent and duct system 230 includes an intake 232 defined in a lower portion of the storage overpack 212, an outlet 234 defined in an upper portion of the storage overpack 212, and a duct 236 extending from the intake 232 and the outlet 234 between an inner side (not numbered) of the storage overpack 212 an outer side (not numbered) of the HCC 242. In one example embodiment, the duct 236 is an annular passage between the storage overpack 212 and the HCC 242.

FIGS. 5A-5E are isometric section, enlarged isometric section, top, section, and enlarged views, respectively of the MCTC 142 of FIGS. 3A-3D. As shown, the canister housing 144 includes an exterior wall 148 and a plurality of heat dissipation fins 150 extending radially outwardly therefrom. The exterior wall 148 has a top 152 and a bottom 154 disposed opposite and distal the top 152, and preferably a majority, more preferably substantially all, of the heat dissipation fins 150 extend longitudinally from proximate the top 152 to proximate the bottom 154. Furthermore, as shown most clearly in FIG. 5D, the exterior wall 148 is preferably cylindrical-shaped, and the heat dissipation fins 150 in one example embodiment are substantially evenly spaced from one another along the exterior wall 148. Additionally, in one example embodiment the envelope 146 of the MCTC 142 is pressurized with helium, wherein the helium is within the MCTC 142. The pressure of the helium may be proximate atmospheric pressure, and preferably be slightly greater than atmospheric pressure.

Referring again to FIGS. 5A and 5B, the MCTC 142 further includes a plurality of positioning structures 160 disposed internal with respect to the exterior wall 148, and a plurality of plate members 162 defining a plurality of compartments 164, which include a number of potentially empty positions 165. In operation, it will be appreciated that the compartments 164 are configured to store a quantity of irradiated nuclear plant components or high level waste therein, such as, for example and without limitation, a PWR or BWR fuel assembly. Similarly, in a preferred embodiment the potentially empty positions 165 do not store such fuel assemblies, thus advantageously reducing cooling times for fuel assemblies stored in the other compartments 164.

One objective of the instant disclosed concept is to enable the rapid offloading of Spent Nuclear Fuel (SNF) from storage in a nuclear power plant, which has been shut-down or is scheduled for impending shut-down and for which a plant decommissioning option is envisioned. Removing the fuel from a plant's existing storage (typically one or more spent fuel pools—also referred to as SFP's or "Wet Storage") can represent substantial economic savings and also facilitates decisions, scheduling, and work related to the plant's decommissioning.

Although the suppliers of existing modular dry spent fuel canister systems appear to recognize the value of reducing spent fuel offload times from plant storage, this has been approached through loading strategies and not through the development of special-purpose reduced cooling time canisters such as described herein. To enhance the ability of the dry nuclear component handling arrangement 110 (FIGS. 3A-3D) to handle high-heat, short cooling-time Spent Nuclear Fuel (SNF), the MCTC 142 employs a number of technologies including, for example, fin designs, reduced capacity, the vent and duct system 130 (FIG. 3A) and active cooling, discussed above, and also additional technologies, such as composite matrix metal structural materials, through the use of potential empty positions, time-varying solution during loading campaign, and enhanced surface area canister shape canister design.

With respect to the composite matrix metal structural materials, heat transfer is improved by having a relatively small number of materials making up the structural walls of the MCTC 142, and thus a smaller number of material transitions, than encountered with 'sandwich' materials. Additionally, a simplified construction is desired in the MCTC 142 to enhance thermal conductivity, i.e., through the reduction or elimination of heterogeneous composites, sandwiches, and the like. In one example embodiment it may be desirable to utilize boron-containing materials in the structural walls of the MCTC 142. This may be the case, for example, in situations where an early final plant shutdown leads to spent fuel with less burnup than assumed in the case of the HCC 242. This represents significant advantage in terms of using different canister types to accomplish different engineering objectives, since no boron-containing materials may be required in the HCC 242.

Regarding fin designs, it can be appreciated that the heat dissipation fins 150 shown in FIGS. 5A-5E provide significant advantages in terms of improving heat removal from the MCTC 142. Preferably, the heat dissipation fins 150 are supported on the exterior wall 148 of the MCTC 142, i.e., the inner annular surface to facilitate heat removal. Although more expensive, it will yield a substantial benefit in terms of removing heat and reducing cooling times.

With respect to reduced capacity, the MCTC 142 houses a reduced number of fuel assemblies, as compared to the HCC 242 counterpart. This has the dual benefits of reducing the total heat load and allowing for better thermal cooling pathways. Preferably there is a reduced distance of the average and/or most remote fuel assembly with respect to the canister outer surface.

Figure 5A:
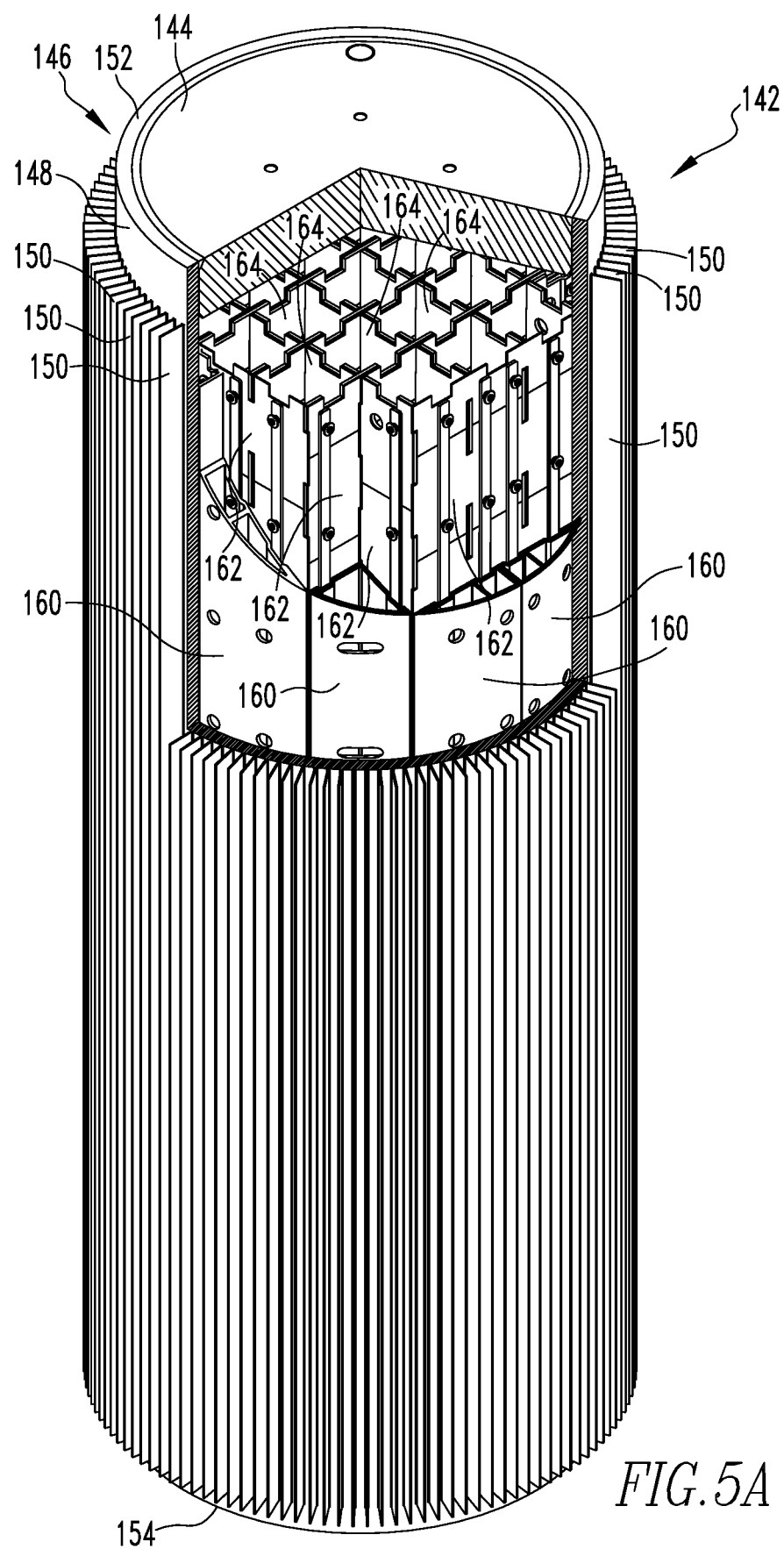
FIG. 5A is an isometric section view of the inner canister of the dry nuclear component handling arrangement of FIGS. 3A-3D shown with an outer portion thereof sectionally removed in order to show internal details.
Figure 5B:
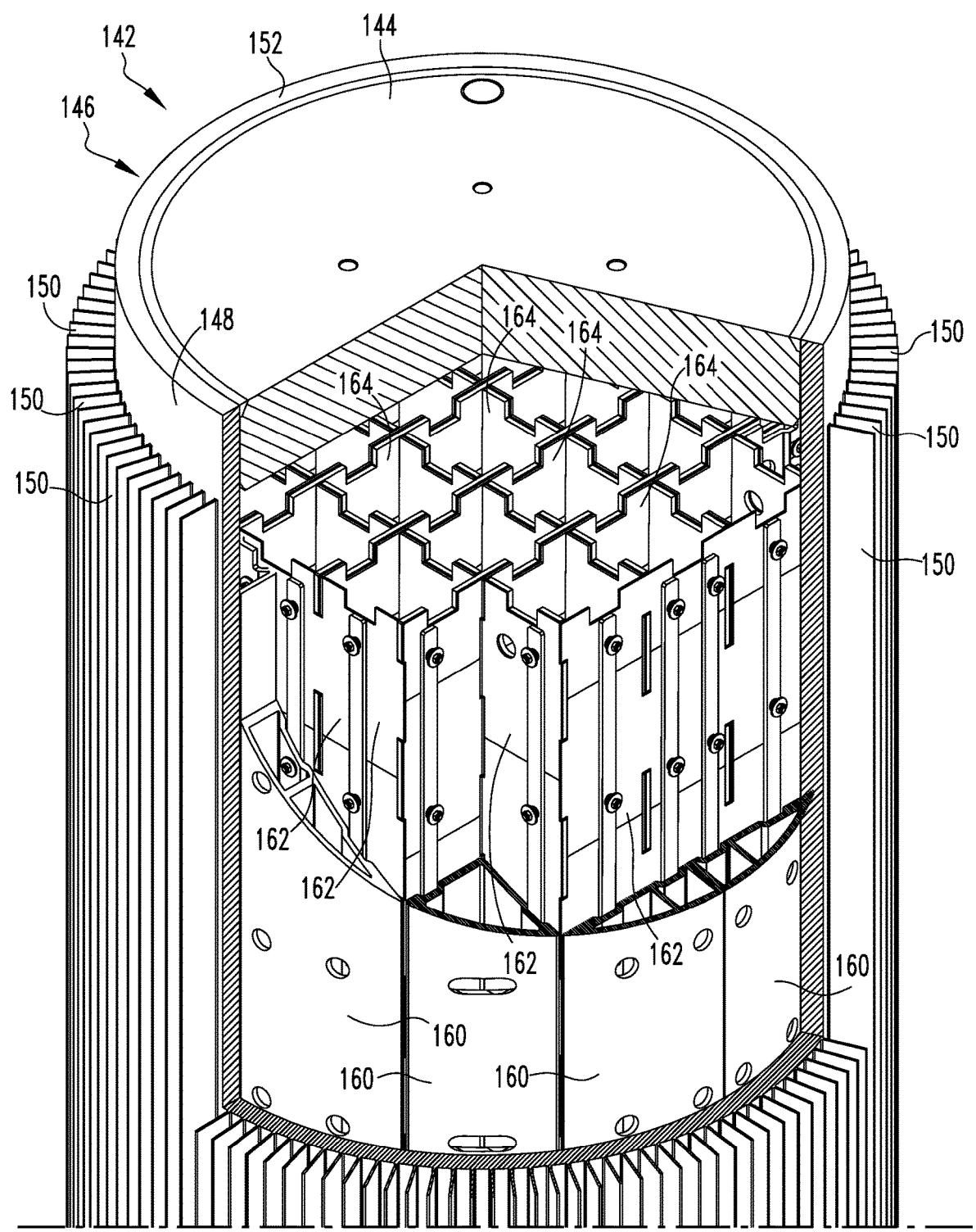
FIG. 5B is an enlarged view of a portion of the inner canister of FIG. 5A.
Figure 5C:
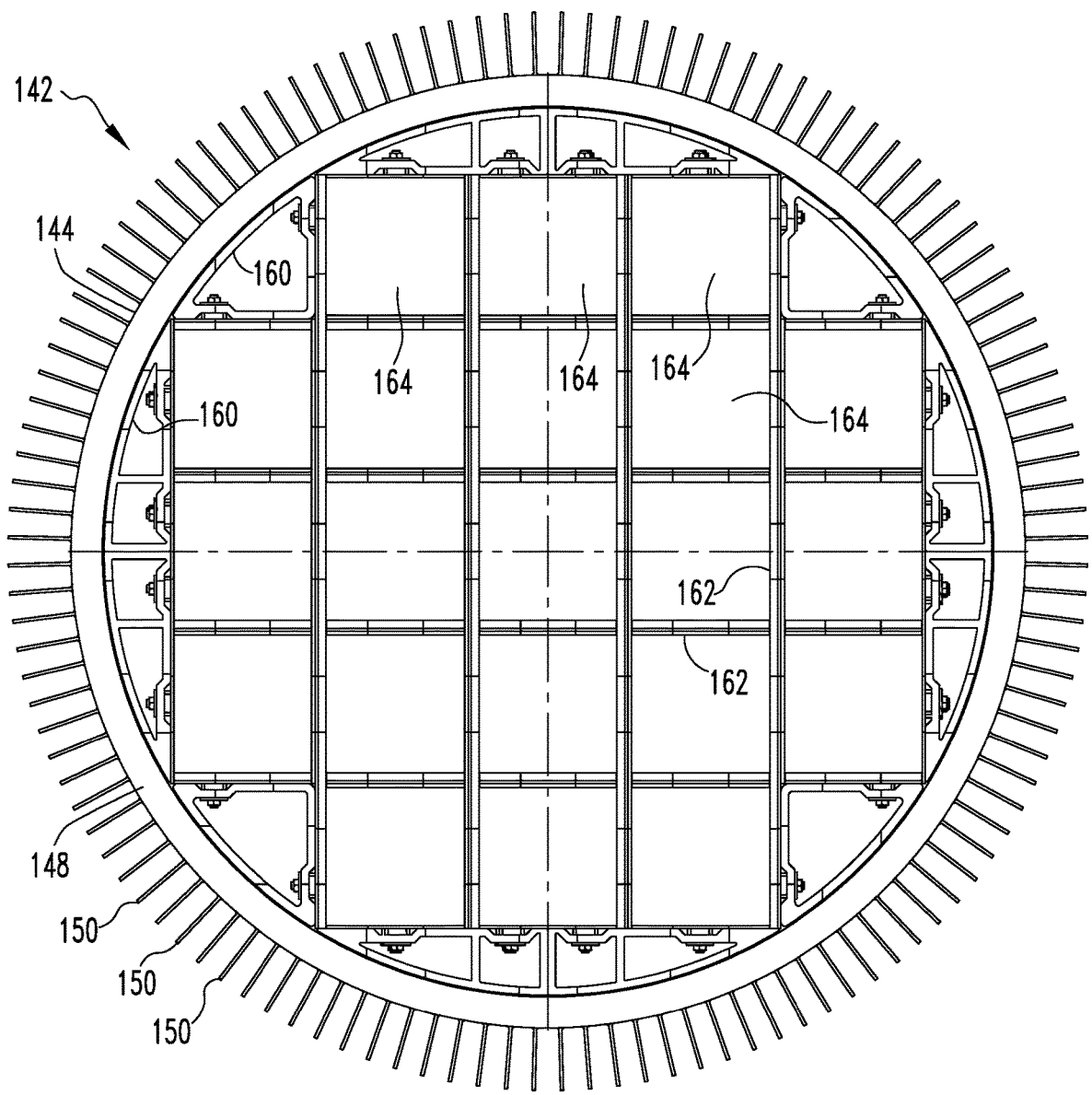
FIG. 5C is a top view of the inner canister of FIG. 5B, shown without a lid.
Figure 5D:
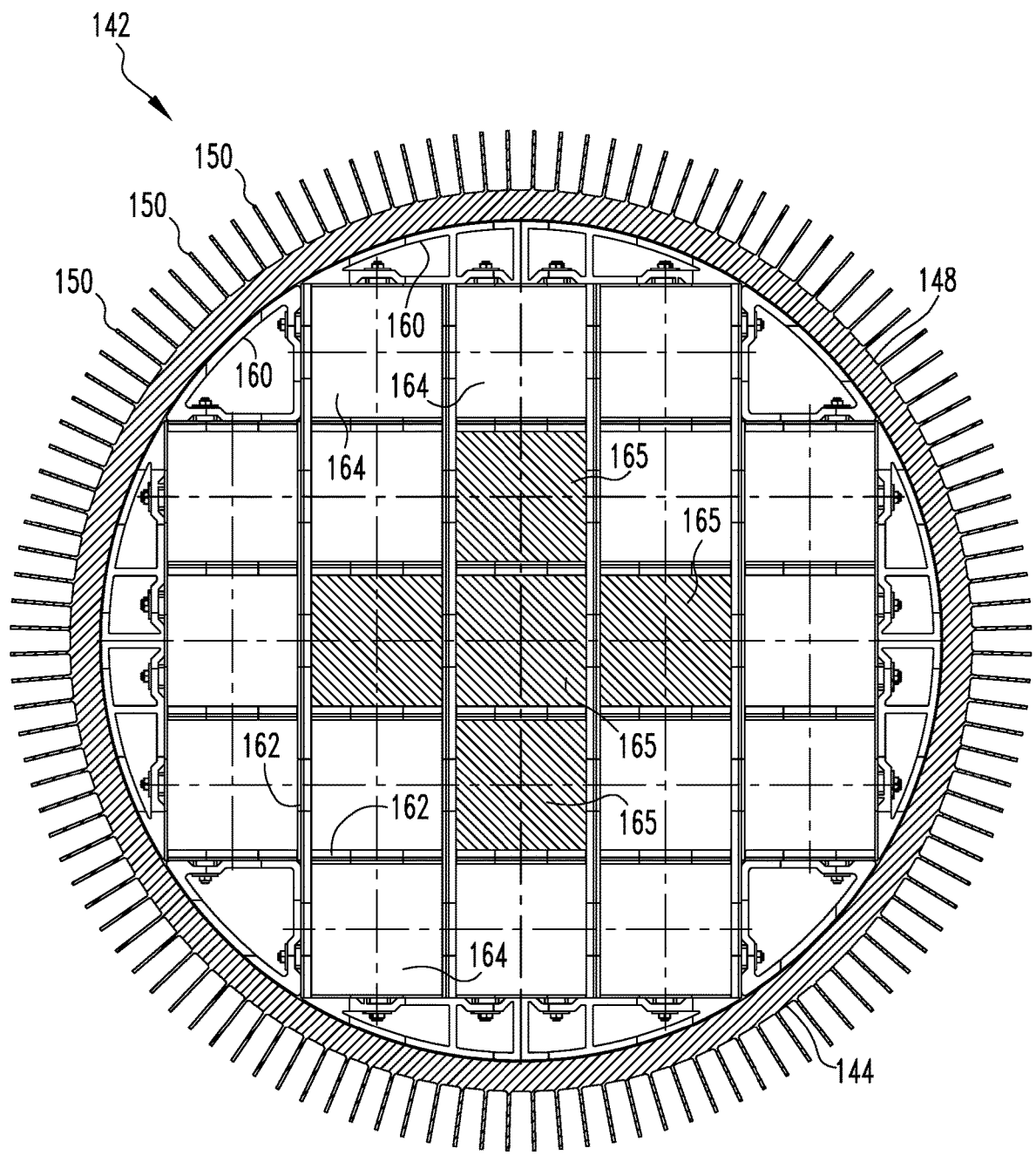
FIG. 5D is a section view of the inner canister of FIG. 5C, showing a preferred embodiment.
Figure 5E:
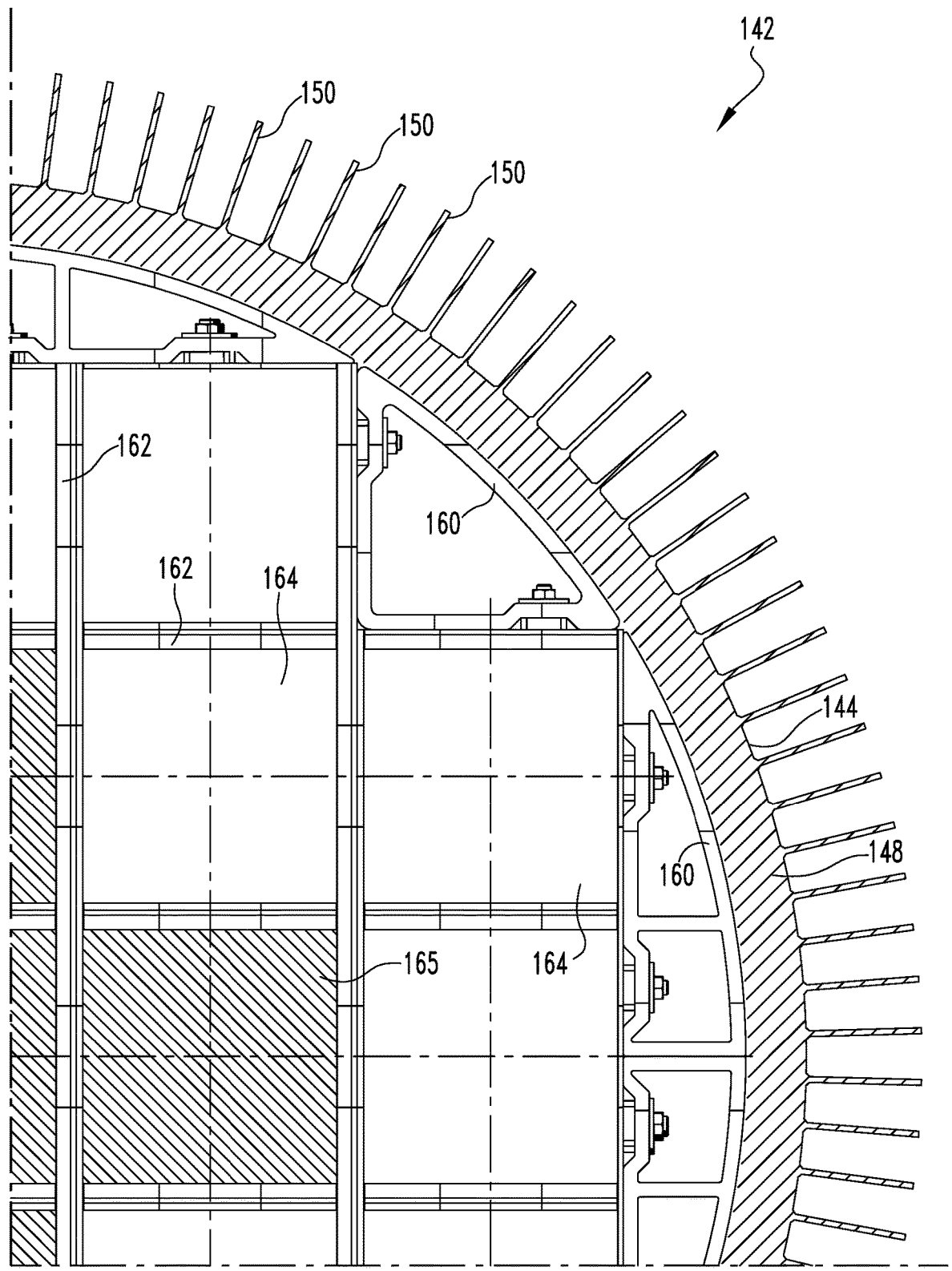
FIG. 5E is an enlarged view of a portion of the inner canister of FIG. 5D.

Regarding the use of potential empty positions, reference is made to FIG. 5D. As shown, the potentially empty positions 165 in the center of the MCTC 142, e.g., the compartments that are shaded in, represent compartments that can be empty when the MCTC 142 is used. This enables the development of different loading approaches to best fit a plant's need for number of assemblies and desired fuel decay time.

With respect to time-varying solution during loading campaign, at spent fuel decay times as short as contemplated by the disclosed concept (e.g., without limitation, as short as 1.5 years), the problem of accommodating decay heat may be considered as one which is essentially a time-varying one—in other words, a transient problem. For spent fuel with decay times near 1.5 years, spent fuel assemblies may, in one non-limiting example embodiment have a decay heat that decays by approximately 10% per month. This allows for new methods of accommodating the amount of heat as a function of time. For example, the quantity of fuel to be loaded in the MCTC 142 can be varied, increasing the number of assemblies during the loading process. One embodiment, for example, consists of a 21-slot canister housing from 16 to 21 assemblies, with the number accommodated increasing over a relatively short loading duration. See, for example, FIG. 5D. Thus later canisters would house more spent fuel assemblies than earlier ones.

Regarding the enhanced surface area canister shape canister design, this refers to an annular canister configuration, in which a reduced number of fuel assemblies each lie closer to one or two of the cask's external walls. Such an MCTC's reduced capacity and shorter thermal paths would both aid heat removal.

Figure 6A:
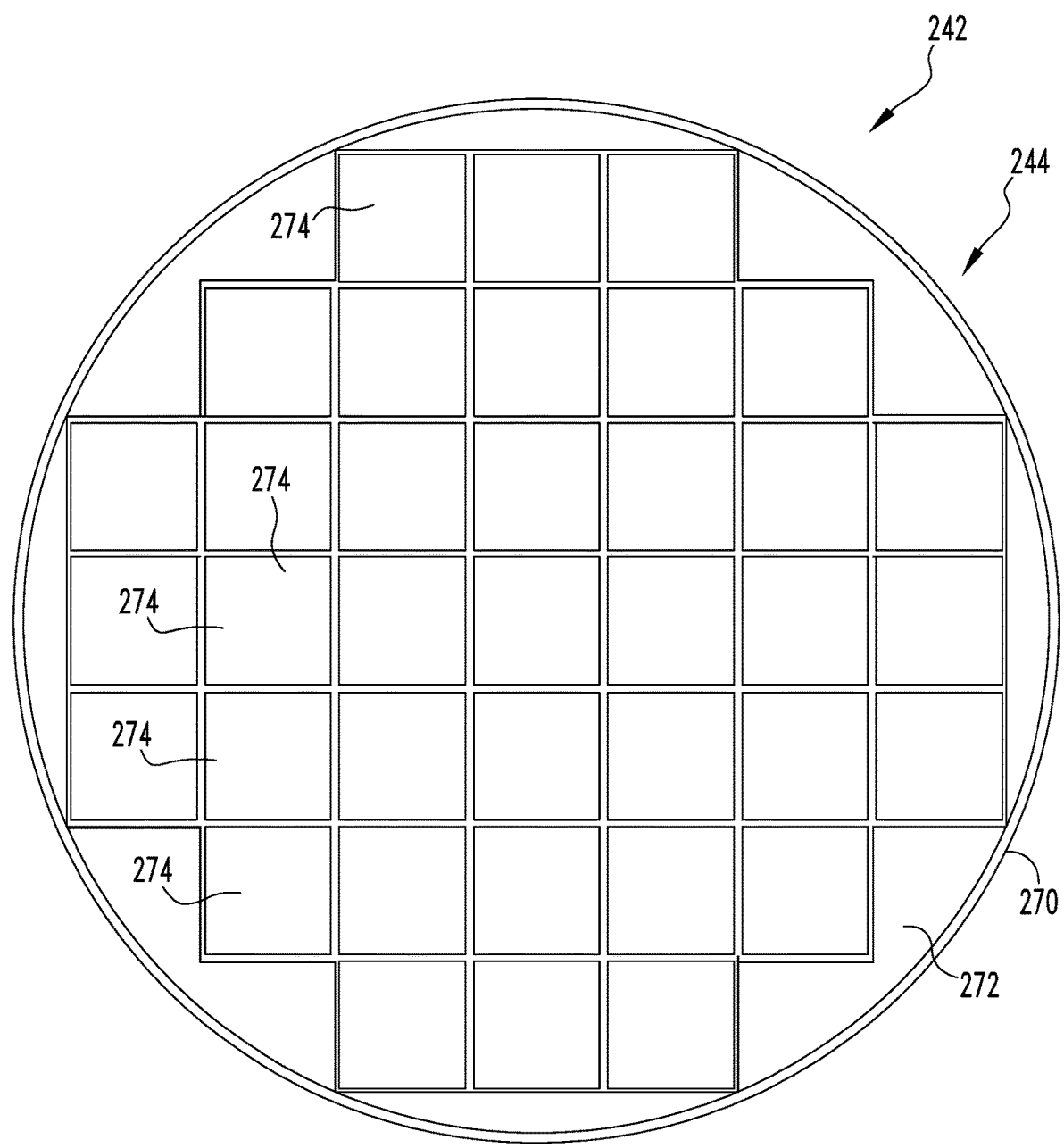
FIG. 6A is a simplified top view of an inner canister for the dry nuclear component handling arrangement of FIGS. 4A-4D shown with a lid removed.
Figure 6B:
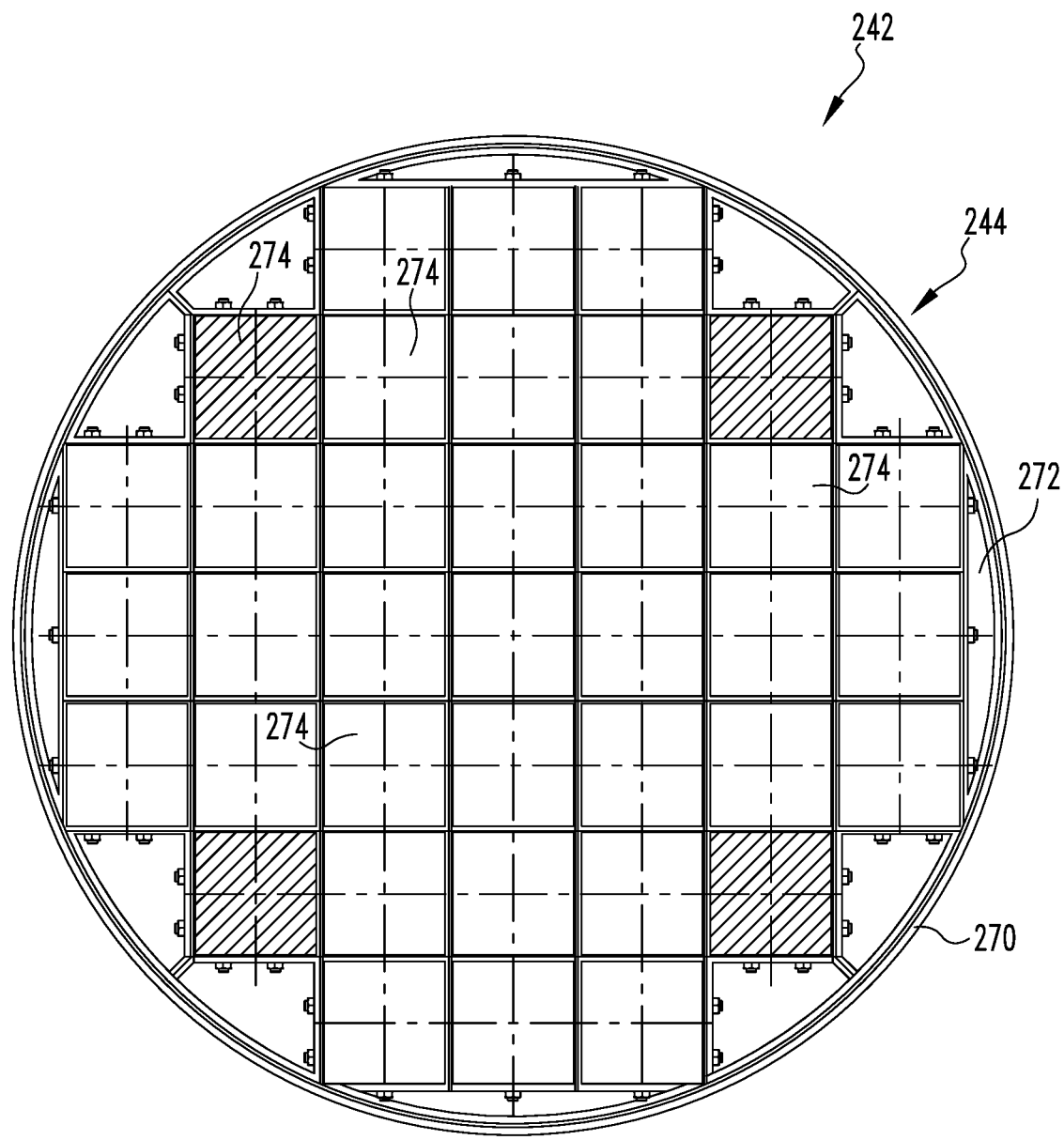
FIG. 6B is another top view of the inner canister of FIG. 6A, showing a preferred embodiment.

FIGS. 6A and 6B show simplified and top views, respectively, of portions of the inner canister 242 of FIGS. 4A-4D. As mentioned above, the inner canister 242 functions as a high capacity canister (HCC) 242. Accordingly, referring to FIG. 6A, the canister housing 244 of the HCC 242, in one example embodiment, has an exterior surface 270 and an interior volume 272. Located in the interior volume 272 are preferably a plurality of compartments 274. The HCC 242 preferably has a relatively large number of the compartments 274. For example and without limitation, the HCC 242 may have 37 compartments 274 each configured to store a quantity of irradiated nuclear plant components or high level waste therein, such as, for example and without limitation, a PWR or BWR fuel assembly. Additionally, in one example embodiment the interior volume 272 houses a plurality of components each devoid of a material containing a neutron poison. In one example embodiment the plurality of components may be a plurality of fuel cell walls each made of a material devoid of a neutron poison.

The HCC 242 preferably employs a number of technologies in order to store a relatively large number of irradiated nuclear plant components or high level waste therein. For example, the HCC 242 preferably employs reduced spacing and/or reduced complexity, uses analytical methods in order to take credit for fission product poisons, relies on a relatively dry canister construction (e.g., assures the exclusion of neutron moderator (e.g., water) during transportation), and focuses on criticality control (e.g., the use of metal matrix composites or the like). More specifically with respect to criticality control, these are used, as needed, in the event that analytical and moderator exclusion methods and the consideration of spent fuel pool boric acid prove insufficient.

FIG. 7 is a simplified isometric view of another outer cask (e.g., without limitation, transportation cask 412) for another dry nuclear component handling arrangement, in accordance with another non-limiting embodiment of the disclosed concept. An inner canister (e.g., any one of the inner canisters 142,242 discussed above) is configured to be located in an interior of the transportation cask 412. In a preferred embodiment, the transportation cask 412 will itself feature moderator exclusion.

Figure 8:
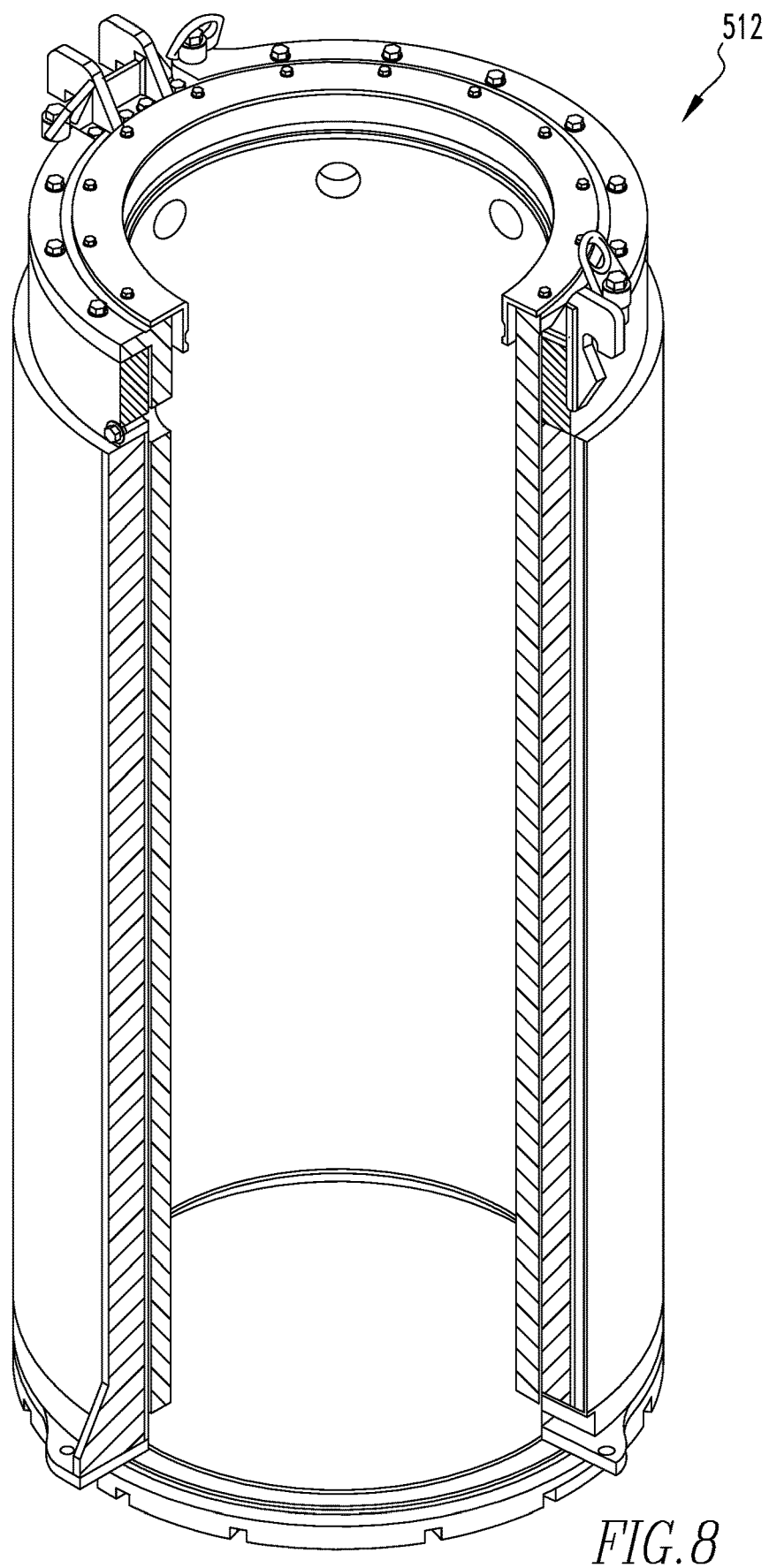
FIG. 8 is simplified isometric view of an outer cask for use in a dry nuclear component handling arrangement, in accordance with another non-limiting embodiment of the disclosed concept, shown with portions removed to show internal details thereof.

FIG. 8 is a simplified isometric section view of a portion of another outer cask (e.g., without limitation, transfer cask 512) for another dry nuclear component handling arrangement, in accordance with another non-limiting embodiment of the disclosed concept. An inner canister (e.g., any one of the inner canisters 142,242 discussed above) is configured to be located in an interior of the transfer cask 512, for example during spent fuel loading in a utility's spent fuel pool.

From the foregoing it is thus to be appreciated that in contrast to the approach taken by the prior art, the disclosed concept provides a Dual-Criterion Fuel Canister System comprising inner canister modules which are differentiated not by physical fuel or other high level waste type or dimension, but by the category of engineering objective or criterion that applies to the spent fuel or other high level waste in question. As an example, the engineering objective or criterion may include one canister to store a large number of assemblies economically and safely (e.g., the HCC 242). Such a canister (e.g., the HCC 242) would be capable of storing at least 37 PWR fuel assemblies or at least 89 BWR fuel assemblies. As another example, the canister may be designed to greatly reduce the cooling time (or radioactive decay time), as compared to conventional spent fuel storage canisters, that must transpire in order to load spent nuclear fuel to store or transport the spent nuclear fuel, so as to meet the governing decay heat requirements and capabilities. This second example has been referred to as a Minimum Cooling Time Canister or MCTC. Preferably, the cooling time will be reduced from approximately 10 years to less than 2 years, preferably as low as 1.5 years.

Figure 9:
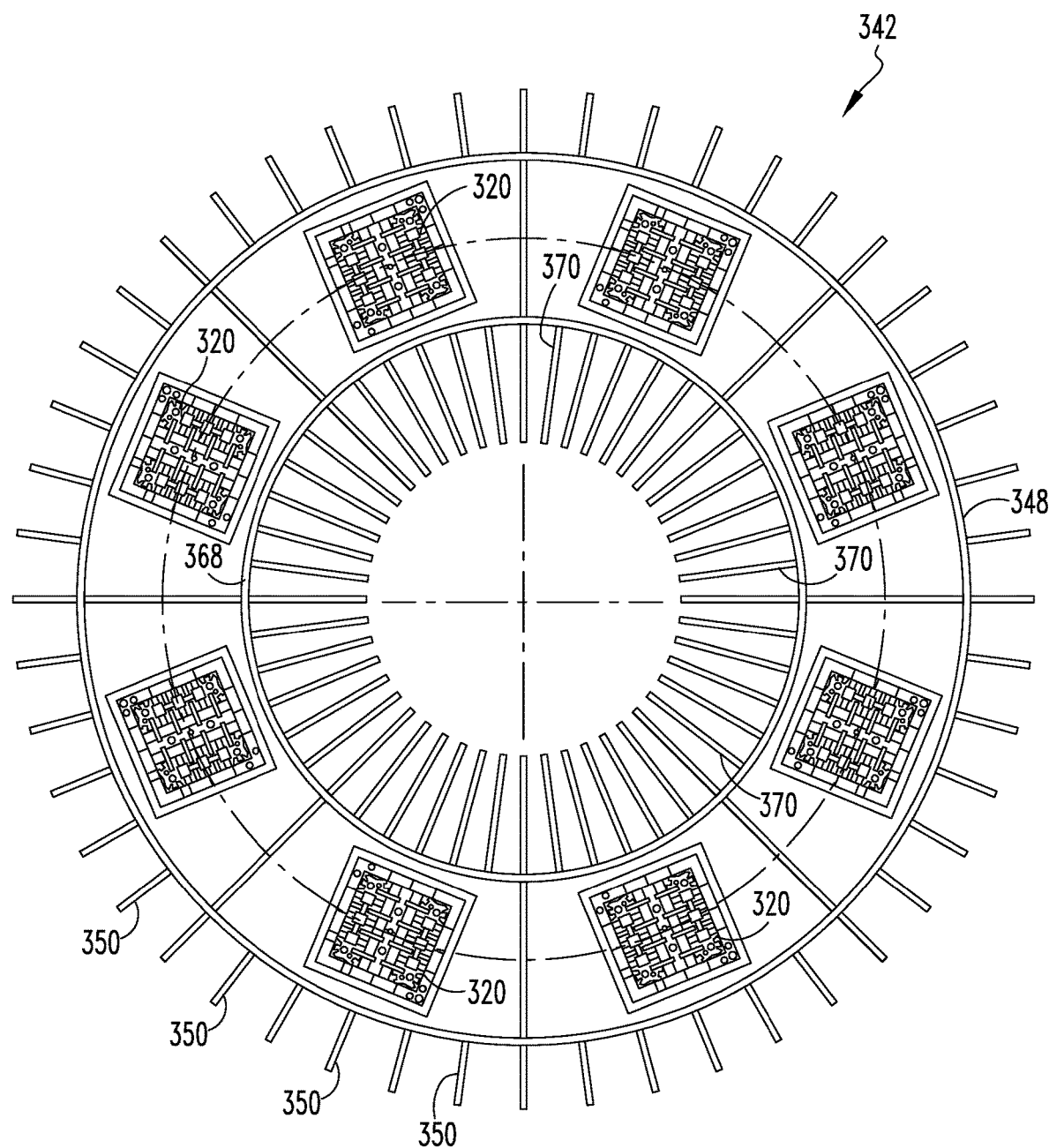
FIG. 9 is a top view of another inner canister, shown with a plurality of nuclear fuel components disposed therein, in accordance with another non-limiting embodiment of the disclosed concept.

FIG. 9 is a top view of another inner canister (e.g., without limitation MCTC 342) housing a plurality of fuel assemblies 320, that may be employed in a dry nuclear component handling arrangement (e.g., without limitation, dry nuclear component handling arrangement 110 in place of the inner canister 142), in accordance with another non-limiting embodiment of the disclosed concept. In one example embodiment the MCTC 342 is an enhanced surface area canister shape having an exterior wall 348, an inner concentric canister wall 368 within, spaced from, and concentric with the exterior wall 348, a plurality of heat dissipation fins 350 extending radially outwardly from the exterior wall 348, and another plurality of heat dissipation fins 370 that extend inwardly in a generally radial direction into a generally open space surrounded on a side by the inner concentric canister wall 368 and open to an external environment. This embodiment also shows that the MCTC 342 has a reduced capacity for storing fuel assemblies (e.g., only 8 fuel assemblies are shown in FIG. 9) over that stored in conventional casks and a decreased average assembly-to-wall separation than is found in conventional casks.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An inner canister for use with an outer cask in a dry nuclear component handling arrangement, the inner canister comprising a canister housing configured to store a quantity of irradiated nuclear plant components or high level waste therein, the canister housing having an outer envelope configured to fit within an interior profile of the outer cask, wherein the inner canister comprises one of either: a first canister comprising a plurality of heat dissipation elements or a second canister comprising a plurality of components devoid of neutron absorbing materials.

2. The inner canister of claim 1, wherein the inner canister comprises the first canister, wherein the canister housing comprises an exterior wall, and wherein the plurality of heat dissipation elements comprise a plurality of heat dissipation fins extending radially outwardly from the exterior wall.

3. The inner canister of claim 2, wherein the exterior wall has a top and a bottom disposed opposite and distal the top; and wherein at least a majority of the plurality of heat dissipation fins extends longitudinally from proximate the top to proximate the bottom.

4. The inner canister of claim 2, wherein the exterior wall is substantially cylindrical-shaped; and wherein the plurality of heat dissipation fins are substantially evenly spaced from one another along the exterior wall.

5. The inner canister of claim 1, wherein the inner canister comprises the second canister, wherein the canister housing comprises an interior volume and the plurality of components are housed therein.

6. The inner canister of claim 1, wherein the inner canister comprises the second canister, and wherein the plurality of components comprise a plurality of fuel cell walls devoid of neutron absorbing materials.

7. A dry nuclear component handling arrangement:
an outer cask having a cask housing defining an interior envelope; and
an inner canister having a canister housing configured to store a quantity of irradiated nuclear plant components or high level waste therein, the canister housing having an outer envelope configured to fit within the interior envelope of the outer cask,
wherein the inner canister comprises one of either: a first canister comprising a plurality of heat dissipation elements or a second canister comprising a plurality of components devoid of neutron absorbing materials.

8. The dry nuclear component handling arrangement of claim 7, including a vent and duct system between the inner canister and the outer cask configured to remove heat from the inner canister.

9. The dry nuclear component handling arrangement of claim 8 wherein the vent and duct system comprises:
an intake in a lower portion of the outer cask,
an outlet in an upper portion of the outer cask, and
a duct defined between an inner side of the outer cask and an outer side of the inner canister and extending between the intake and the outlet.

10. The dry nuclear component handling arrangement of claim 9, wherein the inner canister comprises the first canister, wherein the canister housing comprises an exterior wall, and wherein the plurality of heat dissipation elements comprise a plurality of heat dissipation fins extending radially outwardly from the exterior wall into the duct.

11. The dry nuclear component handling arrangement of claim 10, wherein the inner canister is an enhanced surface area canister shape having an inner concentric canister wall within, spaced from, and concentric with the exterior wall; wherein the inner canister further includes a plurality of heat dissipation fins that extend inwardly in a generally radial direction into a generally open space surrounded on a side by the inner concentric canister wall and open to an external environment.

12. The dry nuclear component handling arrangement of claim 9, wherein the duct is an annular passage between the outer cask and the inner canister.

13. The dry nuclear component handling arrangement of claim 7, wherein the envelope of the inner canister is pressurized with helium.

14. The dry nuclear component handling arrangement of claim 13, wherein the pressure of the helium is either proximate atmospheric pressure or greater than atmospheric pressure.

15. The dry nuclear component handling arrangement of claim 7, wherein a wall of the inner canister comprises a composite matrix metal structural material.

16. The dry nuclear component handling arrangement of claim 15, wherein the composite matrix metal structural material is a metal matrix composite.

17. The dry nuclear component handling arrangement of claim 7, including an active cooling system for cooling the inner canister during loading of the irradiated nuclear plant components or high level waste therein.

18. A dry nuclear component canister system comprising:
an outer cask system comprising a plurality of outer casks including a storage overpack, a transfer cask and a transportation cask, with each of the outer casks having a similar interior profile; and
an inner canister system comprising a plurality of inner canisters, each inner canister configured to store an irradiated nuclear plant component or high level waste, each inner canister having an outer envelope that fits within the interior profile of the outer casks.

19. The dry nuclear component canister system of claim 18, wherein the plurality of inner canisters comprises a canister comprising a plurality of components devoid of neutron absorbing materials.

20. The dry nuclear component canister system of claim 18, wherein the plurality of inner canisters comprises a canister comprising a plurality of heat dissipation elements.

21. The inner canister of claim 1, wherein the neutron absorbing materials comprise boron.

* * * * *